US009846673B2

(12) United States Patent
Kasahara et al.

(10) Patent No.: US 9,846,673 B2
(45) Date of Patent: Dec. 19, 2017

(54) PROCESSOR, ACCELERATOR, AND DIRECT MEMORY ACCESS CONTROLLER WITHIN A PROCESSOR CORE THAT EACH READS/WRITES A LOCAL SYNCHRONIZATION FLAG AREA FOR PARALLEL EXECUTION

(71) Applicant: WASEDA UNIVERSITY, Tokyo (JP)

(72) Inventors: Hironori Kasahara, Tokyo (JP); Keiji Kimura, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 91 days.

(21) Appl. No.: 14/355,339

(22) PCT Filed: Oct. 30, 2012

(86) PCT No.: PCT/JP2012/078043
§ 371 (c)(1),
(2) Date: Jun. 10, 2014

(87) PCT Pub. No.: WO2013/065687
PCT Pub. Date: May 10, 2013

(65) Prior Publication Data
US 2014/0304491 A1 Oct. 9, 2014

(30) Foreign Application Priority Data
Nov. 4, 2011 (JP) .................. 2011-242824

(51) Int. Cl.
*G06F 9/52* (2006.01)
*G06F 15/76* (2006.01)
(Continued)

(52) U.S. Cl.
CPC ............ *G06F 15/76* (2013.01); *G06F 9/3001* (2013.01); *G06F 9/30087* (2013.01); *G06F 9/38* (2013.01);
(Continued)

(58) Field of Classification Search
CPC ...... G06F 9/30087; G06F 9/3877; G06F 9/52; G06F 9/522
See application file for complete search history.

(56) References Cited

U.S. PATENT DOCUMENTS 6,044,206 A * 3/2000 Kohn .................. G06F 9/30087
709/248
6,832,305 B2 * 12/2004 Park .................... G06F 9/30149
712/205
(Continued)

FOREIGN PATENT DOCUMENTS

JP S61-134863 A 6/1986
JP S63-240664 A 10/1988
(Continued)

OTHER PUBLICATIONS

Translation of the International Preliminary Report on Patentability dated Oct. 9, 2014 issued in corresponding PCT Application No. PCT/JP2012/078043, 9 pages.
(Continued)

*Primary Examiner* — Jacob A Petranek
(74) *Attorney, Agent, or Firm* — Rankin, Hill & Clark LLP

(57) ABSTRACT

It is provided a processor system comprising at least one processor core including a processor, a memory and an accelerator. The memory includes an instruction area, a synchronization flag area and a data area. The accelerator starts, even if the processor is executing another processing, acceleration processing and executes read instruction in a case where the read instruction is a flag checking instruction and a flag indicating the completion of predetermined processing has been written; and stores the data subjected to the acceleration processing after completion of the acceleration processing, and further writes a flag indicating the completion of the acceleration processing. The processor starts,
(Continued)

even if the accelerator is executing another processing, read instruction corresponding to a flag in a case where the read instruction is the flag checking instruction and it is confirmed that the flag indicating the completion of the acceleration processing has been written.

25 Claims, 18 Drawing Sheets

(51) Int. Cl.
    *G06F 9/30*      (2006.01)
    *G06F 13/28*     (2006.01)
    *G06F 15/167*    (2006.01)
    *G06F 9/38*      (2006.01)

(52) U.S. Cl.
    CPC ............... *G06F 9/52* (2013.01); *G06F 13/28* (2013.01); *G06F 15/167* (2013.01)

(56) References Cited

U.S. PATENT DOCUMENTS

| | | | |
|---|---|---|---|
| 7,191,294 B2* | 3/2007 | Nakamura | G06F 9/522 711/147 |
| 7,516,323 B2* | 4/2009 | Inoue | G06F 21/57 712/203 |
| 7,590,823 B1* | 9/2009 | Ansari | G06F 9/3877 712/200 |
| 2006/0080479 A1 | 4/2006 | Anjo et al. | |
| 2007/0174841 A1 | 7/2007 | Chamberlain et al. | |
| 2007/0255929 A1 | 11/2007 | Kasahara et al. | |
| 2007/0283337 A1 | 12/2007 | Kasahara et al. | |
| 2007/0283358 A1 | 12/2007 | Kasahara et al. | |
| 2008/0022030 A1* | 1/2008 | Hagiwara | G06F 13/364 710/308 |
| 2008/0086617 A1 | 4/2008 | Kasahara et al. | |
| 2009/0319767 A1 | 12/2009 | Mizumoto | |
| 2010/0146310 A1 | 6/2010 | Kasahara et al. | |

FOREIGN PATENT DOCUMENTS

| | | |
|---|---|---|
| JP | H10-091603 A | 4/1998 |
| JP | 2002-530736 A | 9/2002 |
| JP | 2006139766 A | 6/2006 |
| JP | 2006-293768 A | 10/2006 |
| JP | 2007-317152 A | 12/2007 |
| JP | 2007-328415 A | 12/2007 |
| JP | 2007-328416 A | 12/2007 |
| JP | 4476267 B2 | 4/2008 |
| JP | 2009528584 A | 8/2009 |
| JP | 2010-003151 A | 1/2010 |
| WO | 0029941 A1 | 5/2000 |

OTHER PUBLICATIONS

S. Thakkar et al., "The Internet Streaming SIMD Extensions," Intel Technology Journal Q2, 1999.
M. Awaga et al., "The uVP 64-Bit Vector Coprocessor: A New Implementation of High Performance Numerical Computation," IEEE Micro, vol. 13, No. 5, Oct. 1993.
"NVIDIA CUDA C Programming Guide, Version 3.2," Oct. 22, 2010.
"OMAP-L137 Applications Processor System, Reference Guide," Texas Instruments, Mar. 2010.
International Search Report dated Feb. 5, 2013 issued in corresponding PCT application No. PCT/JP2012/078043, 9 pages.
International Preliminary Report on Patentability dated Mar. 3, 2014 issued in corresponding PCT application No. PCT/JP2012/078043, 19 pages.
James E. Smith, "Decoupled Access/Execute Computer Architectures," IEEE 1982.
Written Opinion dated Feb. 5, 2013 issued in corresponding PCT application No. PCT/JP2012/078043, 6 pages.

* cited by examiner

```
for(){ /*outer for loop*/
    DTU load (LM <- offchip)
    for(){ /* inner for loop*/
        {/*ACCELERATOR PROCESSING*/
            ACCELERATOR load (reg <- LM)
            arithmetic operation
            ACCELERATOR store (reg -> LM)
        }
        prepare for next loop
    }
    DTU store (LM -> offchip)
}
```

US 9,846,673 B2

PROCESSOR, ACCELERATOR, AND DIRECT MEMORY ACCESS CONTROLLER WITHIN A PROCESSOR CORE THAT EACH READS/WRITES A LOCAL SYNCHRONIZATION FLAG AREA FOR PARALLEL EXECUTION

INCORPORATE BY REFERENCE

The present application claims priority from Japanese patent application JP 2011-242824 filed on Nov. 4, 2011, the content of which is hereby incorporated by reference into this application.

BACKGROUND OF THE INVENTION

This invention relates to an accelerator and a processor system including the accelerator.

In order to improve a throughput of a specific function of a computer including a processor system, in particular, a multi-core processor system as a component thereof and suppress power consumption thereof to a low level, a hardware module called "accelerator" (hereinafter also referred to as "ACC") is incorporated into the processor system. The ACC represents, for example, a graphic accelerator for speeding up graphic display, a 3D accelerator for speeding up three-dimensional display, or the like.

Up to now, a tight coupling method and a loose coupling method are known as methods of coupling such an ACC to the processor system.

The tight coupling method represents a method of integrating the ACC with a CPU (central processing unit or general-purpose processor; hereinafter also referred to simply as "processor") or coupling the ACC to the CPU in an almost integrated manner. In the tight coupling method, the ACC and the processor function in close cooperation with each other, and an advantage that overhead for activating and controlling the ACC is low is provided. This also provides an advantage that the ACC can be efficiently used even when the ACC takes a short time to execute short vector processing (acceleration processing whose processing data amount is relatively small) or the like.

However, the tight coupling method poses a problem that, when the ACC is newly coupled to a processor, an instruction set of the processor needs to be extended in accordance with the ACC to be coupled. Examples of the extended instruction set include streaming SIMD extensions (SSE) disclosed in S. Thakkar, T. Huff, "The Internet Streaming SIMD Extensions", Intel Technology Journal Q2, 1999.

Further, as a technology in the category of the tight coupling method, a technology, such as a co-processor, relating to a method for coupling the ACC directly to the processor is disclosed in, for example, M. Awaga, H. Takahashi, "The uVP 64-Bit Vector Coprocessor: A New Implementation of High Performance Numerical Computation", IEEE Micro, Vol. 13, No. 5, October 1993. In this method, there is no need to extend the instruction set, but the co-processor needs to be called for each processing unit (accelerator instruction). Due to this, higher overhead is required, and thus, thereby posing a problem that improvement in arithmetic operation speed is impaired as a whole.

On the other hand, the loose coupling method represents, for example, a method, such as a graphics processing unit (GPU), for coupling the ACC to an external bus of the processor as disclosed in "NVIDIA CUDA C Programming Guide Version 3.2", 2010 or a method, such as an open multimedia application platform (OMAP), for coupling the ACC to an internal bus of the processor as disclosed in "OMAP-L137 Application Processor System Reference Guide", Texas Instruments, March, 2010. In the loose coupling method, although there is a difference between an external bus coupling method and an internal bus coupling method, the ACC and the processor are separately provided, and hence it is possible to reserve an abundance of arithmetic units and memories for the ACC, and an advantage that the loose coupling method is suitable for regular arithmetic processing for a huge amount of data is provided.

Further, in the loose coupling method, there is no need to extend the instruction set.

However, in the loose coupling method, it is necessary to call the ACC and transfer data for each processing unit (accelerator instruction). Due to this, higher overhead is required, thereby posing a problem that the improvement in the arithmetic operation speed is impaired as a whole. Therefore, the loose coupling method is not suitable for irregular arithmetic processing.

Further, the above-mentioned multi-core processor system represents a processor system formed of a plurality of processor cores, and each of the processor cores includes the processor and, as necessary, the above-mentioned ACC.

In the multi-core processor system, processing is parallelized by the plurality of processor cores, thereby reducing the power consumption and improving an arithmetic throughput. Therefore, a parallelizing compiler for converting a serial processing program that can operate only on the processor system formed of one processor into a parallel processing program that can operate in parallel on a so-called multi-core processor formed of a plurality of processor cores analyzes an input program of the serial processing, extracts portions that can operate in parallel from the input program, and allocates the arithmetic processing for the portions to a plurality of processors, thereby improving the throughput compared to the processor system formed of one processor as described above.

Technologies and the like disclosed in the following Patent Documents are known as technologies relating to: an architecture of such a multi-core processor system, in particular, the multi-core processor system having a plurality of processor cores including a general-purpose processor and an application-specific processor (such as ACC); and the parallelizing compiler for generating a parallel processing program that can operate in parallel on the multi-core processor.

JP 2006-293768 A discloses a technology relating to: a compiler for, in a multi-core processor system in which a variety of processor cores are mounted, efficiently operating each processor core by automatically extracting tasks having parallelism from an input program of serial processing to be processed and arranging the tasks in accordance with characteristics of the respective processor cores, and further generating a code for optimizing an operating frequency and a power supply voltage by estimating a processing amount of the processor core before adding the code to a target program; and a multiprocessor system that enables optimization thereof.

JP 2007-328415 A discloses a technology for preventing, in a heterogeneous multiprocessor system including a plurality of processor elements (such as processors) which are different in the instruction set and configuration, resources of a specific processor element from becoming short to improve the throughput of the whole multiprocessor system.

JP 2007-328416 A discloses a technology that allows efficient processing at low power while making maximum use of performance of a multiprocessor system, in which a variety of processor cores are integrated, by using a method of parallelizing a program by cooperation of a plurality of compilers for dividing the program, arranging portions thereof, and generating a control code therefor in such a manner as to efficiently operate the processor core.

JP 4476267 B discloses a technology for reducing, in a multi-core processor in which a data transfer mechanism is provided to each of a plurality of processor cores, overhead for data transfer between the processor cores, while using a compiler to facilitate optimization of the data transfer, thereby improving the throughput of the whole processor.

SUMMARY OF THE INVENTION

However, the above-mentioned heterogeneous multi-core processor includes at least one processor core including a general-purpose processor core and at least one processor core including an application-specific processor such as an ACC. However, in order to suppress the power consumption and improve the arithmetic throughput compared to the above-mentioned heterogeneous multi-core processor, it is necessary to have the general-purpose processor and the application-specific processor such as an ACC coexist in the processor core and to form the multi-core processor to include a plurality of processor cores thus formed.

Even when the above-mentioned ACC is provided inside or outside each of the processor cores mounted to such a multi-core processor system, it is necessary to employ any one of the tight coupling method and the loose coupling method described above.

However, the above-mentioned related-art tight coupling method or loose coupling method poses several problems of, for example, as described above, the need for extending the instruction set and an increase in processing overhead in accordance with the data transfer.

For example, in the above-mentioned tight coupling method, when the ACC is newly coupled to a processor, the instruction set of the processor needs to be extended in accordance with the ACC to be coupled (for example, streaming SIMD extensions). Further, particularly when the processor is a reduced instruction set computer (RISC) type of processor, it is difficult to encode an instruction with a limited instruction length. In particular, in order to newly extend the instruction set, it is necessary to extend the instruction set and greatly extend hardware therefor (for example, an instruction decoding part and a processor control part).

Further, the tight coupling method poses a problem that a register for supplying a sufficient amount of data to the ACC that requests for a large amount of data at a time cannot be reserved for the ACC because the processor and the ACC are integrated. Therefore, it is not possible to constantly input data to the ACC, and thus, a utilization ratio of an arithmetic unit is low.

It should be noted that, in the coupling method for coupling the ACC directly to the processor such as a co-processor, it is not necessary to extend the instruction set of the processor. However, the co-processor is called for each processing unit of the instruction, and thus, control overhead increases.

On the other hand, a physical distance between the ACC and the processor in the above-mentioned loose coupling method is farther than that in the tight coupling method, and thus, the overhead for control of the ACC and the overhead for the data transfer to the ACC considerably increase.

This invention has been made in view of the above-mentioned problems, and an object thereof is to provide: an ACC capable of ensuring a sufficient data supply capacity of the ACC without a need to extend an instruction set of a processor when the ACC is newly coupled to the processor and of reducing control overhead of the ACC; and a multi-core processor system provided inside or outside thereof with a processor core including the ACC.

In order to solve the above-mentioned problems, for example, the configuration disclosed in the accompanying claims is employed.

The disclosure of the Description includes solutions to solve the problem. The representative one of inventions disclosed in this application is outlined as follows. A processor system comprises at least one processor core provided on a semiconductor chip and including a processor for performing arithmetic processing, a memory and an accelerator coupled to the processor and the memory through a coupling network. The memory includes an instruction area for storing a task executed by the processor and the accelerator in advance, a synchronization flag area for storing a flag used to synchronize an operation of the processor and an operation of the accelerator therebetween, and a data area for storing data to be processed by the processor and the accelerator and the processed data. The accelerator is configured to read an instruction included in the task to be executed by the accelerator which is stored in the instruction area when the processor system is booted; operate in accordance with the read instruction; start, even if the processor is executing another processing, acceleration processing by reading the data written in the data area and execute the read instruction corresponding to a flag in a case where the read instruction is a flag checking instruction and it is confirmed by the flag checking instruction that the flag indicating that the processor has completed predetermined processing has been written into the synchronization flag area; and store the data subjected to the acceleration processing into the data area by the instruction read by the accelerator after completion of the acceleration processing, and further write a flag indicating that the completion of the acceleration processing into the synchronization flag area by a flag setting instruction read by the accelerator. The processor is configured to read the instruction included in the task executed by the processor which is stored in the instruction area when the processor system is booted; operate in accordance with the read instruction; start, even if the accelerator is executing another processing, the read instruction corresponding to a flag in a case where the read instruction is a flag checking instruction and it is confirmed by the flag checking instruction that the flag indicating the completion of the acceleration processing has been written into the synchronization flag area.

According to one embodiment of this invention, each of the processor and the ACC can autonomously operate without requiring much time for synchronization control therebetween, and hence it is possible to ensure the sufficient data supply capacity of the ACC without having to extend the instruction set of the processor when the ACC is newly coupled thereto and to reduce the control overhead of the ACC.

DETAILED DESCRIPTION OF THE PREFERRED EMBODIMENT

Now, a description is made of an embodiment of this invention with reference to the accompanying drawings.

Figure 1:
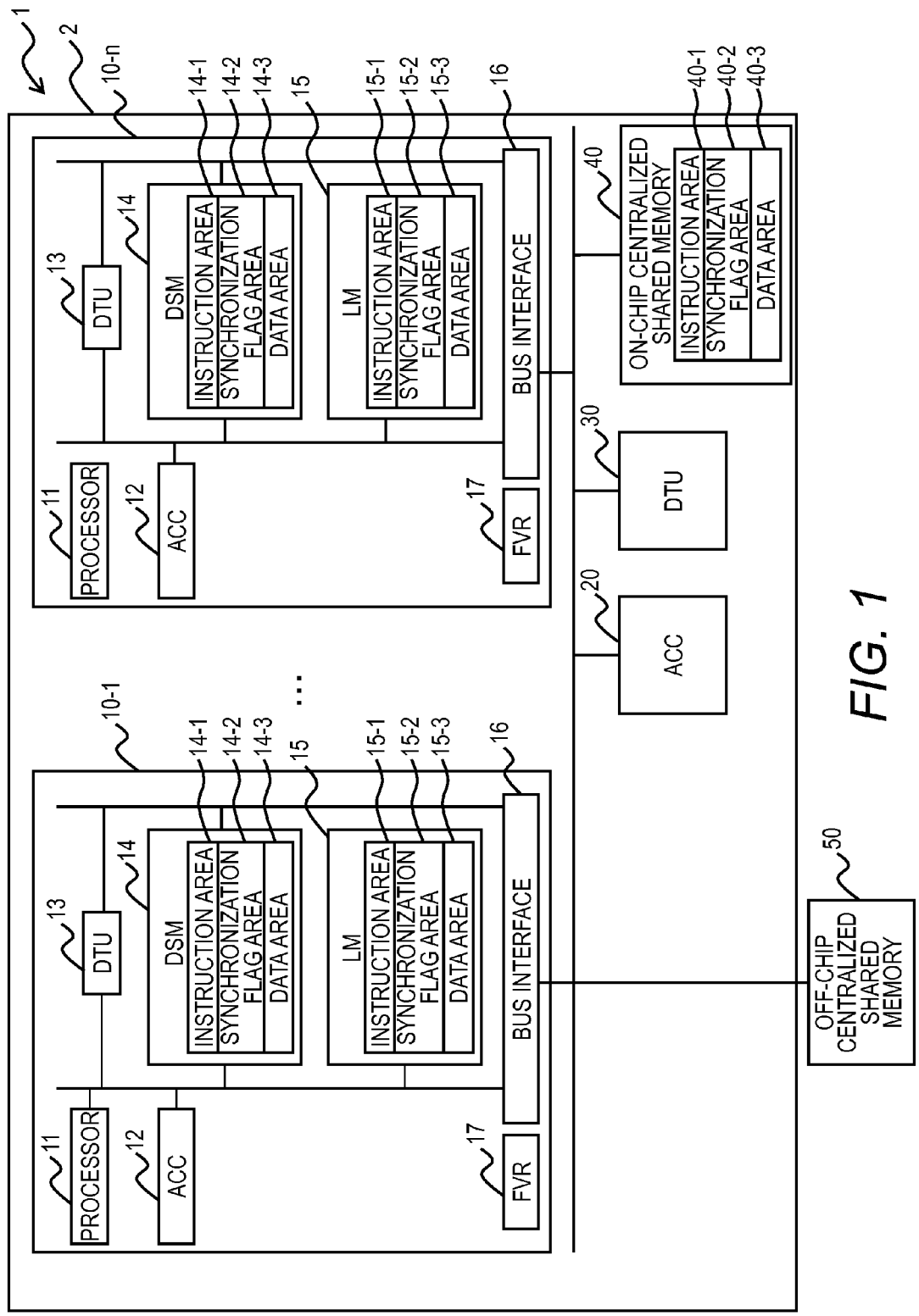
FIG. 1 is a diagram illustrating a configuration example of a multi-core processor system according to the embodiment of this invention.

FIG. 1 is a diagram illustrating a configuration example of a multi-core processor system (processor system) 1 according to the embodiment of this invention.

The multi-core processor system 1 illustrated in FIG. 1 is provided on one semiconductor chip 2 and includes: a plurality of processor cores 10-1 to 10-n each including an accelerator (ACC) in addition to a general-purpose processor, a data transfer unit (DTU), and a memory; an ACC 20; a DTU 30; an on-chip centralized shared memory 40; and an off-chip centralized shared memory 50 outside the semiconductor chip 2. The respective processor cores 10-1 through 10-n are coupled to one another through an inter-processor-core coupling network (bus) such as a shared bus. It should be noted that any one of or both of the on-chip centralized shared memory 40 and the off-chip centralized shared memory 50 may be provided.

The description of this embodiment is made by presenting a configuration example of a homogeneous multi-core processor system 1 in which the respective processor cores 10-1 through 10-n have the same configuration. Therefore, only the configuration of the processor core 10-1 is described, and descriptions of the other processor cores 10-2 through 10-n are omitted. It should be noted that this invention can be applied to not only a homogeneous multi-core processor system but also a heterogeneous multi-core processor system.

The processor core 10-1 includes a processor 11, an ACC 12, a DTU 13, a distributed shared memory (DSM) 14, a local memory (LM) 15, a bus interface 16, and a frequency/voltage control register (FV register; FVR) 17.

The processor 11 is a central processing unit for executing various kinds of arithmetic processing.

The ACC 12 is an ACC capable of processing a specific function at high speed and low power consumption. The ACC 12 according to this embodiment autonomously operates even without an instruction issued from the processor 11. The ACC 12 is described later in detail.

The DTU 13 is a kind of direct memory access controller (DMAC) having a function of executing an instruction string based on synchronization flag checking described later, a function of writing the synchronization flag, and other such functions, and is a data transfer apparatus for executing data transfer among the ACC 12, the DSM 14, the LM 15, or the DSM 14 of each of the other processor cores 10-2 to 10-n. The DTU 13 according to this embodiment starts operating in accordance with a single instruction issued from the processor 11, and then autonomously operates. The DTU 13 is also described later in detail. The local memory 15 stores data used by only one processor, and the distributed shared memory 14 stores data that is shared by a plurality of processors. The DSM 14 is a distributed shared memory that can be accessed by all the processor cores 10-1 through 10-n. The respective DSMs 14 included in the processor cores 10-1 through 10-n are arranged in one memory map shared by all the processor cores 10-1 through 10-n, and all the processor cores 10-1 through 10-n refer to the memory map to access the DSM 14 of each of the processor cores 10-1 through 10-n. The DSM 14 is used for passing calculation results by the own or other processor 11 or the DTU 13. The DSM 14 includes an instruction area 14-1, a synchronization flag area 14-2, and a data area 14-3.

Further, for example, the LM 15 within the processor core 10-1 is local memory that can be accessed by only the processor 11, the ACC 12, and the DTU 13 of the processor core 10-1 and cannot be accessed by the other processor cores 10-2 through 10-*n*. The LM 15 includes an instruction area 15-1, a synchronization flag area 15-2, and a data area 15-3.

The bus interface 16 is an interface for communicating data to/from the other processor cores 10-2 through 10-*n*, the ACC 20, the DTU 30, the on-chip centralized shared memory 40, and the off-chip centralized shared memory 50.

The FVR 17 is a register for executing control of at least one of a frequency or a power supply voltage for determining a supply voltage to the processor 11 or an operating frequency thereto.

The ACC 20 is an accelerator such as a GPU which is coupled to an external bus of the processor 11 of each of the processor cores 10-1 through 10-*n* and substitutes processing of the processor 11.

The DTU 30 is coupled to the external bus of the processor 11 of each of the processor cores 10-1 through 10-*n*, and is an optional data transfer apparatus for executing data transfer among the LMs 15 and the DSMs 14 of the respective processor cores 10-1 through 10-*n*, the DSMs 14 on the other processor cores, the on-chip centralized shared memory 40, and the off-chip centralized shared memory 50 and data transfer among the DSMs 14 of the respective processor cores 10-1 through 10-*n*, the ACC 20, the on-chip centralized shared memory 40, and the off-chip centralized shared memory 50.

The on-chip centralized shared memory 40 is a memory on the semiconductor chip 2 which is coupled to each of the processor cores 10-1 through 10-*n* and shared by all the processor cores 10-1 through 10-*n*. The on-chip centralized shared memory 40 includes an instruction area 40-1, a synchronization flag area 40-2, and a data area 40-3. The on-chip centralized shared memory 40 stores information such as shared data that cannot be stored in the DSM 14 or a task queue necessary for dynamic scheduling.

The off-chip centralized shared memory 50 is an optional memory outside the semiconductor chip 2 which is coupled to each of the processor cores 10-1 through 10-*n* and shared by all the processor cores 10-1 through 10-*n*. The off-chip centralized shared memory 50 may include an instruction area (not shown), a synchronization flag area (not shown), and a data area (not shown) as necessary. Further, the off-chip centralized shared memory 50 can be configured to allow access from another multi-core processor when another multi-core processor system (multiprocessor chip) coexists together with the on-chip centralized shared memory 40 and the DSM 14. The off-chip centralized shared memory 50 stores data that is too large to be stored in the on-chip centralized shared memory 40.

In the above-mentioned configuration, the instruction areas 14-1, 15-1, and 40-1 store instructions (programs) for the processor 11, the ACC 12, and the DTU 13 that are generated by a parallelizing compiler described later. As the instruction for the ACC 12, there are instructions for the ACC 12 including various arithmetic operation instructions such as addition and multiplication, a flag setting instruction, a flag checking instruction, and an instruction string execution starting instruction based on flag checking. Further, as the instruction for the DTU 13, there are instructions for the DTU 13 including the instruction for data transfer, the flag setting instruction, the flag checking instruction, and the instruction string execution starting instruction based on the flag checking.

It should be noted that the instruction to be executed by the processor core 10-1 is located in the instruction areas 14-1 and 15-1 of the processor core 10-1 as a rule. However, the instruction having a large size is located in the instruction area 40-1 of the on-chip centralized shared memory 40. In this case, the processor core 10-1 reads (loads) the instruction located in the instruction area 40-1. On the other hand, the instructions for the ACC 20 and the DTU 30 are located in the instruction area 40-1 of the on-chip centralized shared memory 40 or an instruction area (not shown) of the off-chip centralized shared memory 50.

In the same manner, the synchronization flag areas 14-2, 15-2, and 40-2 store the synchronization flags for the processor 11, the ACC 12, and the DTU 13 generated by the parallelizing compiler. The synchronization flag represents a flag (data) used when the processor 11, the ACC 12, and the DTU 13 cooperatively operate in synchronization with one another. In the synchronization flag areas 14-2, 15-2, and 40-2, the synchronization flag is located for each processing set (for example, task) executed by the processor core 10-1. When the processing set is loop processing, the synchronization flag to which a version number is attached may be located based on the number of loops of the loop processing. Details thereof are described later. On the other hand, the synchronization flags for the ACC 20 and the DTU 30 are located in the synchronization flag area 40-2 of the on-chip centralized shared memory 40 or the synchronization flag area (not shown) of the off-chip centralized shared memory 50.

The data areas 14-3, 15-3, and 40-3 store data to be processed by the processor 11, the ACC 12, and the DTU 13 and processed data. On the other hand, data to be processed by the ACC 20 and the DTU 30 and the processed data are stored in the data area 40-3 of the on-chip centralized shared memory 40 or the synchronization flag area (not shown) of the off-chip centralized shared memory 50.

As described above, the processor 11, the ACC 12, and the DTU 13 on the processor core 10-1 share the DSM 14 and the LM 15 on the own processor core 10-1.

Further, the processor 11, the ACC 12, and the DTU 13 on each of the processor cores 10-1 through 10-*n* share the DSM 14 on each of the processor cores 10-1 through 10-*n* and the on-chip centralized shared memory 40.

It should be noted that the multi-core processor system 1 may include only the necessary memory among the DSM 14, the LM 15, the on-chip centralized shared memory 40, and the off-chip centralized shared memory 50 in accordance with the purpose of the own system.

Further, the multi-core processor system 1 may be formed of one processor core, and in that case, it is not necessary to provide the ACC 20, the DTU 30, or the like. In addition, the plurality of processor cores 10-1 through 10-*n* within the multi-core processor system 1 may include a general-purpose processor core that does not include the ACC 12.

Figure 2:
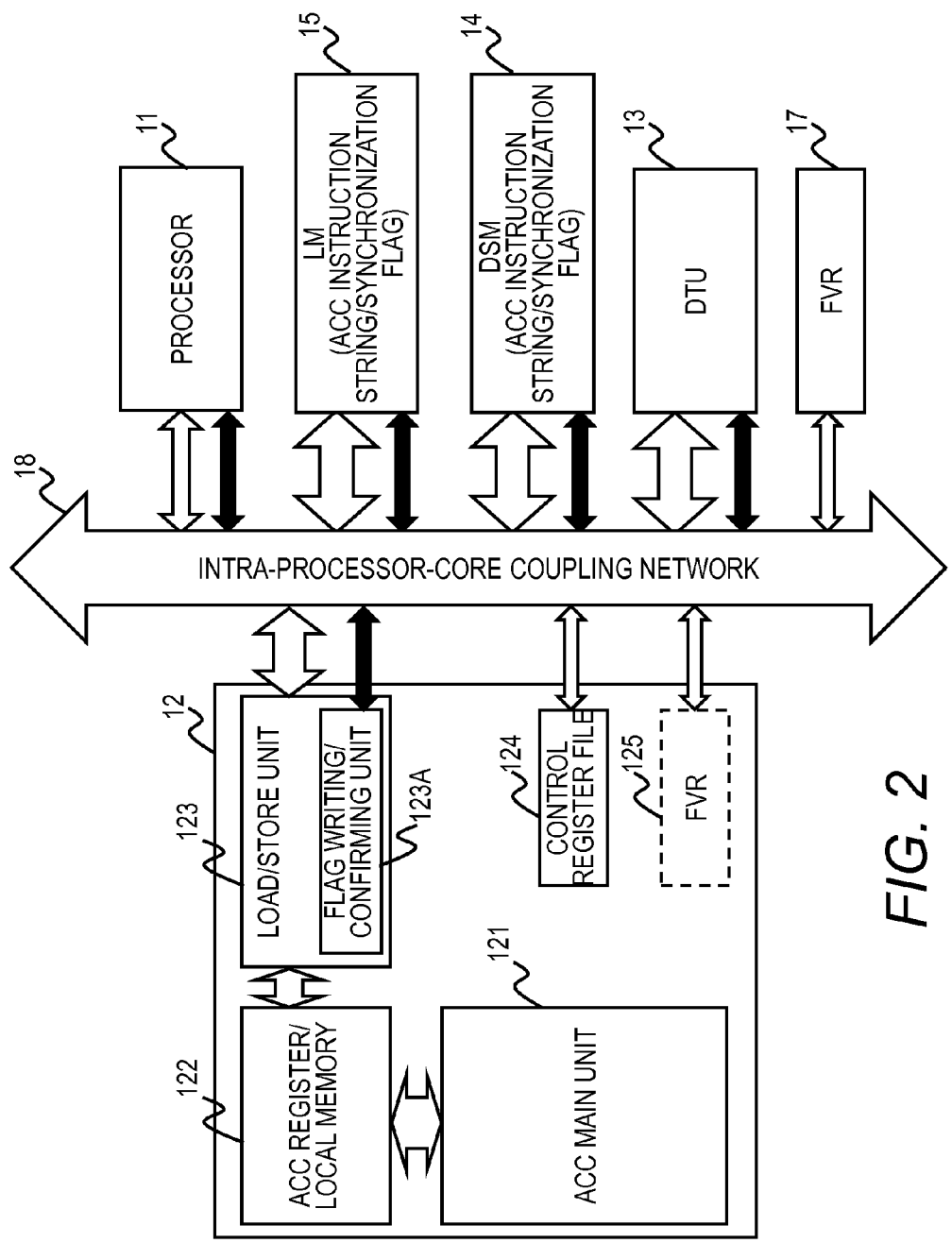
FIG. 2 is a diagram illustrating a first configuration example of the ACC and a configuration example of the processor core including the ACC according to the embodiment of this invention.

FIG. 2 is a diagram illustrating a first configuration example of the ACC 12 and a configuration example of the processor core including the ACC 12 according to the embodiment of this invention. It should be noted that, in the following description, the same components as those illustrated in FIG. 1 are denoted by the same reference numerals, and duplicate descriptions thereof are omitted appropriately. In FIG. 2, the black arrows indicate communications of the synchronization flag. The white arrows indicate communications for transmission of the instruction and the data other than the synchronization flag. The thickness of each of the arrows indicates a level of communication speed.

In FIG. 2, the ACC 12 includes an ACC main unit 121, an ACC register/local memory 122 (hereinafter referred to simply as "ACC register 122"), a load/store unit 123, a control register file 124, and an FVR 125, and is coupled to the processor 11, the LM 15, the DSM 14, the DTU 13, and the FVR 17 through an intra-processor-core coupling network (such as a bus or a switching network) 18.

The ACC main unit 121 is an ACC main unit for executing only specific processing by using an ACC instruction string stored in the LM 15 or the DSM 14. It should be noted that the ACC instruction string represents a program (program for sequentially executing a plurality of instruction strings) for the ACC 12 generated by the parallelizing compiler in advance.

The ACC register 122 is a storage part such as a register for supplying data to the ACC main unit 121. In particular, when the ACC is the ACC 20 (such as GPU) illustrated in FIG. 1, the ACC register represents a local memory uniquely provided to the ACC 20. The ACC register 122 can be accessed by only the ACC main unit 121 and the load/store unit 123, and cannot be accessed by the processor 11 or the like coupled through the intra-processor-core coupling network 18. It should be noted that the ACC register 122 may be accessed directly from the component (for example, DTU 13) outside the ACC 12.

It is preferred that the ACC register 122 be a high-speed register such as a vector register for supplying data to the ACC main unit 121 at high speed.

The load/store unit 123 is a data transfer apparatus for executing data transfer between the ACC register 122 and the DSM 14 or the LM 15. The load/store unit 123 reads a series of data within the LM 15 or the DSM 14 into the ACC register 122 in accordance with an instruction called "vector load". Further, the load/store unit 123 stores a series of data within the ACC register 122 into the LM 15 or the DSM 14 in accordance with an instruction called "vector store". The load/store unit 123 includes a flag writing/confirming unit 123A. The flag writing/confirming unit 123A is a function part for writing (setting) the synchronization flag into an address (hereinafter referred to as "predetermined address") of a predetermined (arbitrary) area (address space) on the memory such as the LM 15 or the DSM 14 or confirming (checking) the synchronization flag written in the predetermined address on the memory.

The control register file 124 is a register group formed of a plurality of control registers. The control register file 124 includes a control register for controlling the ACC main unit 121 and a control register for controlling the load/store unit 123.

The FVR 125 is an optional register for determining the supply voltage to the ACC main unit 121 and a clock frequency thereto and performing frequency/power supply voltage (FV) control having a power supply interruption function. The ACC 12 reduces or interrupts the supply voltage to the ACC 12 or the clock frequency thereto in accordance with the value set in the FVR 125 after starting the flag checking. This allows power control.

The ACC 12 having the above-mentioned configuration operates in cooperation with the processor 11 and the DTU 13. Such a cooperative operation is described in brief.

(Cooperative Operation of ACC 12 and Processor 11)

First, as an example of the cooperative operation of the ACC 12 and the processor 11, an operation in which after the load/store unit 123 stores the data into the LM 15 or the DSM 14, the processor 11 starts processing using the stored data is described.

The load/store unit 123 stores data subjected to acceleration processing and stored in the ACC register 122 by the ACC main unit 121, into the data area 15-3 of the LM 15 or the data area 14-3 of the DSM 14. With this operation, the flag writing/confirming unit 123A writes the synchronization flag (data) corresponding to the store processing into the predetermined address on the LM 15 or the DSM 14, namely, the synchronization flag area 15-2 or 14-2. Until the synchronization flag is written into the predetermined address on the LM 15 or the DSM 14, the processor 11 repeatedly checks the predetermined address (15-2 or 14-2) allocated to the synchronization flag of the LM 15 or the DSM 14. When confirming (detecting) the written synchronization flag, the processor 11 starts the own processing by using the data stored in the data area 15-3 or 14-3. In this manner, the ACC 12 and the processor 11 cooperatively operate.

Next, as another example of the cooperative operation of the ACC 12 and the processor 11, an operation in which after the processor 11 stores data into the LM 15 or the DSM 14, the load/store unit 123 starts reading the stored data into the ACC register 122 is described.

The processor 11 stores the processed data into the data area 15-3 of the LM 15 or the data area 14-3 of the DSM 14. With this operation, the processor 11 writes the synchronization flag (data) corresponding to the store processing into the predetermined address on the LM 15 or the DSM 14, namely, the synchronization flag area 15-2 or 14-2. Until the synchronization flag is written into the predetermined address on the LM 15 or the DSM 14, the flag writing/confirming unit 123A repeatedly checks the predetermined address (15-2 or 14-2) allocated to the synchronization flag of the LM 15 or the DSM 14. When confirming (detecting) the written synchronization flag, the flag writing/confirming unit 123A stores the data, which is stored in the data area 15-3 or 14-3, into the ACC register 122. It should be noted that the ACC main unit 121 starts the own processing by using the data stored in the ACC register 122. In this manner, the ACC 12 and the processor 11 cooperatively operate.

(Cooperative Operation of the ACC 12 and the DTU 13)

First, as an example of the cooperative operation of the ACC 12 and the DTU 13, an operation in which when the DTU 13 finishes data transfer processing with respect to the LM 15 or the DSM 14, the load/store unit 123 starts reading the transferred data into the ACC register 122 is described.

When finishing the data transfer to the data area 15-3 of the LM 15 (from, for example, the on-chip centralized shared memory 40), the DTU 13 writes the synchronization flag corresponding to the data transfer processing into the predetermined address on the LM 15 or the DSM 14 or the address designated by the instruction, namely, the synchronization flag area 15-2 or 14-2. Until the synchronization flag is written into the predetermined address on the LM 15 or the DSM 14, the flag writing/confirming unit 123A repeatedly checks the predetermined address (15-2 or 14-2) allocated to the synchronization flag of the LM 15 or the DSM 14. When the flag writing/confirming unit 123A confirms the written synchronization flag, the load/store unit 123 starts reading the data, which is transferred to the data area 15-3 of the LM 15, into the ACC register 122. After that, the ACC main unit 121 executes acceleration processing. Specifically, the flag checking instruction, a data load instruction, and an acceleration processing instruction that are included in a program for the ACC 12 are executed in order. In this manner, the ACC 12 and the DTU 13 cooperatively operate.

Next, as another example of the cooperative operation of the ACC 12 and the DTU 13, an operation in which after the load/store unit 123 stores the data into the LM 15 or the DSM 14, the DTU 13 starts processing using the stored data is described.

The load/store unit 123 stores data subjected to acceleration processing and stored in the ACC register 122 by the ACC main unit 121 into the data area 15-3 on the LM 15 or the data area 14-3 of the DSM 14. Then, the flag writing/confirming unit 123A writes the synchronization flag (data) corresponding to the store processing into the predetermined address on the LM 15 or the DSM 14, namely, the synchronization flag area 15-2 or 14-2. Until the synchronization flag is written into the predetermined address on the LM 15 or the DSM 14, the DTU 13 repeatedly checks the predetermined address (15-2 or 14-2) allocated to the synchronization flag of the LM 15 or the DSM 14. When confirming (detecting) the written synchronization flag, the DTU 13 starts data transfer processing by using the data stored in the data area 15-3 or 14-3. In this manner, the ACC 12 and the DTU 13 cooperatively operate.

Further, the cooperative operation of the processor 11 and the DTU 13 is described. The DTU 13 reads data necessary for the processor core to perform processing into the local memory 15 or the distributed shared memory 14 of the own processor core from the distributed shared memory 14 of another processor core or from the on-chip centralized shared memory 40 or the off-chip centralized shared memory 50 for another processor core, and transfers the data stored in the local memory 15 or the distributed shared memory 14 of the own processor core to another memory. However, such operations are executed by reading a program necessary for the DTU 13 to autonomously operate from the local memory 15 or the like when the processor 11 issues a first instruction for the data transfer to the DTU 13. The cooperative operation for the data transfer performed by the processor 11 and the DTU 13 is disclosed in JP 4476267 B in detail.

As described above, the ACC 12 of the first configuration example, the processor 11 and the DTU 13 cooperatively operate in synchronization with one another based on the flag setting/checking for the LM 15 or the DSM 14.

Figure 3:
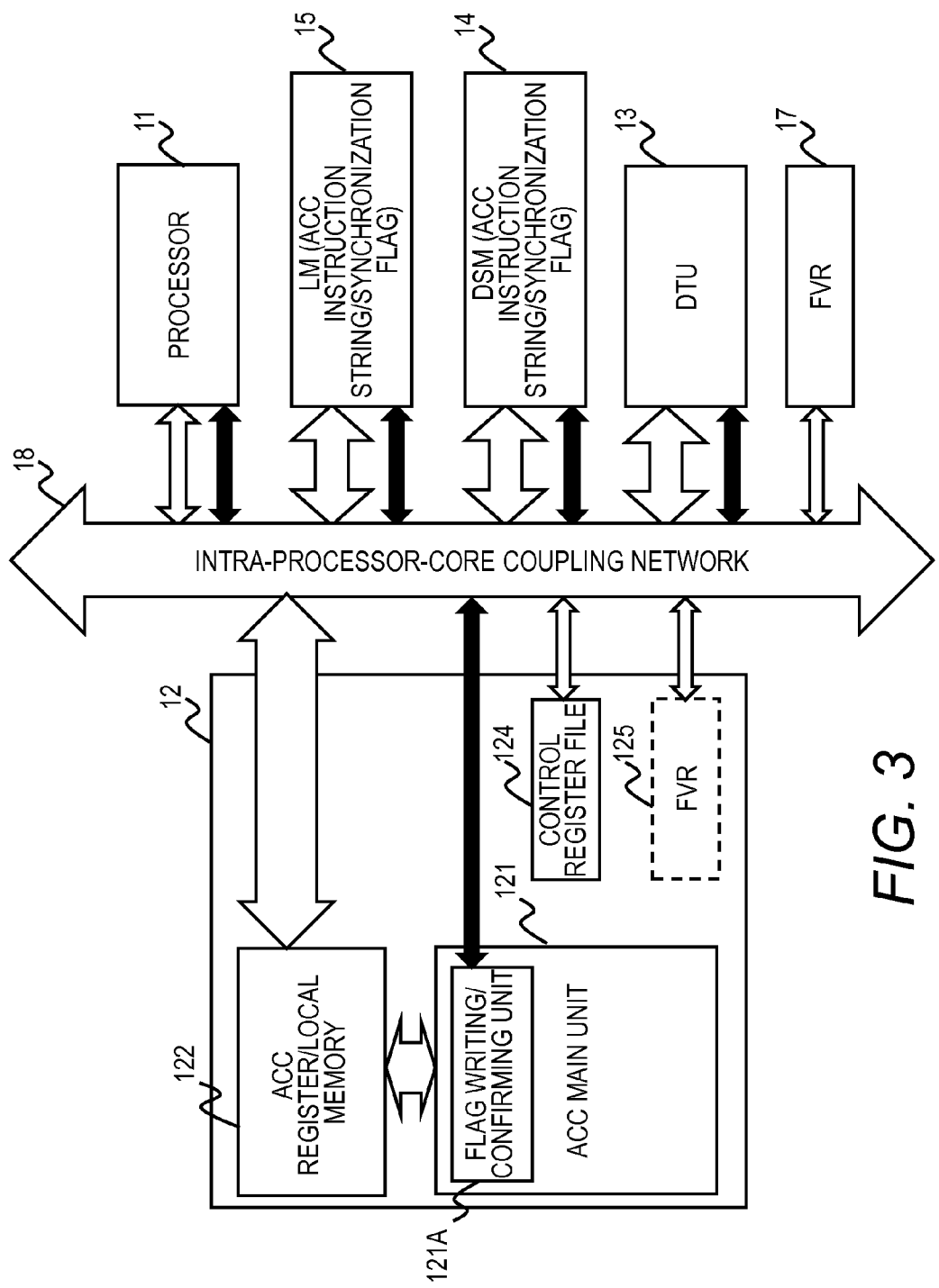
FIG. 3 is a diagram illustrating a second configuration example of the ACC and a configuration example of the processor core including the ACC according to the embodiment of this invention.

FIG. 3 is a diagram illustrating a second configuration example of the ACC 12 and a configuration example of the processor core including the ACC 12 according to the embodiment of this invention. It should be noted that, in the following description, the same components as those illustrated in FIG. 1 and FIG. 2 are denoted by the same reference numerals, and duplicate descriptions thereof are omitted appropriately.

The ACC 12 illustrated in FIG. 3 is different from the ACC 12 illustrated in FIG. 2 in the aspect that the ACC 12 illustrated in FIG. 3 does not include a load/store unit, and therefore includes a flag writing/confirming unit 121A (corresponding to the flag writing/confirming unit 123A in FIG. 2) in the ACC main unit 121. It should be noted that, in the same manner as in the flag writing/confirming unit 123A, the flag writing/confirming unit 121A has the function of writing the synchronization flag into the predetermined address on the memory such as the LM 15 or the DSM 14 or confirming the synchronization flag written in the predetermined address on the memory. Further, the processor 11 or the DTU 13 reads/writes the data from/to the ACC register 122, thereby substituting the function of the load/store unit 123 illustrated in FIG. 2.

The ACC 12 having the above-mentioned configuration operate in cooperation with the processor 11 and the DTU 13. Such a cooperative operation is described in brief.

(Cooperative Operation of ACC 12 and Processor 11)

First, as an example of the cooperative operation of the ACC 12 and the processor 11, an operation in which the ACC 12 starts processing when the processor 11 finishes predetermined processing is described.

When finishing predetermined processing, the processor 11 stores processing result data into the ACC register 122. After that, the processor 11 writes the synchronization flag corresponding to the predetermined processing into the predetermined address on the LM 15 or the DSM 14, namely, the synchronization flag area 15-2 or 14-2. Until the synchronization flag is written into the predetermined address on the LM 15 or the DSM 14, the flag writing/confirming unit 121A repeatedly checks the predetermined address (15-2 or 14-2) allocated to the synchronization flag of the LM 15 or the DSM 14. When the flag writing/confirming unit 121A confirms the written synchronization flag, the ACC main unit 121 starts the own processing by using the processing result data obtained from the processor 11 and stored in the ACC register 122. Specifically, the flag checking instruction, the data load instruction, and the acceleration processing instruction that are included in the program for the ACC 12 are executed in order. In this manner, the ACC 12 and the processor 11 cooperatively operate.

Next, as another example of the cooperative operation of the ACC 12 and the processor 11, an operation in which the processor 11 starts processing when the ACC 12 finishes predetermined processing is described.

When finishing the processing, the ACC main unit 121 writes the processing result data into the ACC register 122. After that, the flag writing/confirming unit 121A writes the synchronization flag corresponding to the predetermined processing into the predetermined address on the LM 15 or the DSM 14, namely, the synchronization flag area 15-2 or 14-2. Until the synchronization flag is written into the predetermined address on the LM 15 or the DSM 14, the processor 11 repeatedly checks the predetermined address (15-2 or 14-2) allocated to the synchronization flag of the LM 15 or the DSM 14. When confirming the written synchronization flag, the processor 11 starts the own processing by reading the processing result data stored in the ACC register 122. In this manner, the ACC 12 and the processor 11 cooperatively operate.

(Cooperative Operation of ACC 12 and DTU 13)

Next, as an example of the cooperative operation of the ACC 12 and the DTU 13, an operation in which the DTU 13 starts data transfer when the ACC main unit 121 finishes processing is described.

When finishing predetermined processing, the ACC main unit 121 transmits processing result data to the ACC register 122. After that, the flag writing/confirming unit 121A writes the synchronization flag corresponding to the predetermined processing into the predetermined address on the LM 15 or the DSM 14, namely, the synchronization flag area 15-2 or 14-2. Until the synchronization flag is written into the predetermined address on the LM 15 or the DSM 14, after finishing another data transfer processing, the DTU 13 repeatedly checks the predetermined address (15-2 or 14-2) allocated to the synchronization flag of the LM 15 or the DSM 14. When confirming the written synchronization flag, the DTU 13 starts processing for reading the data stored in the ACC register 122 and transferring the data to the LM 15 or the DSM 14. In this manner, the ACC 12 and the DTU 13 cooperatively operate.

Next, as an example of the cooperative operation of the ACC 12 and the DTU 13, an operation in which the ACC main unit 121 starts processing when the DTU 13 finishes the data transfer is described.

The DTU 13 writes the data into the ACC register 122 by predetermined data transfer processing. After that, the DTU 13 writes the synchronization flag corresponding to the predetermined processing into the predetermined address on the LM 15 or the DSM 14, namely, the synchronization flag area 15-2 or 14-2. Until the synchronization flag is written into the predetermined address on the LM 15 or the DSM 14, the flag writing/confirming unit 121A repeatedly checks the predetermined address (15-2 or 14-2) allocated to the synchronization flag of the LM 15 or the DSM 14. When the flag writing/confirming unit 121A confirms the written synchronization flag, the ACC main unit 121 starts the own processing by using the data written in the ACC register 122. Specifically, the flag checking instruction, the data load instruction, and the acceleration processing instruction that are included in the program for the ACC 12 are executed in order. In this manner, the ACC 12 and the DTU 13 cooperatively operate.

As described above, the ACC 12 of the second configuration example, the processor 11 and the DTU 13 cooperatively operate in synchronization with one another based on the flag setting/checking for the LM 15 or the DSM 14.

Figure 4:
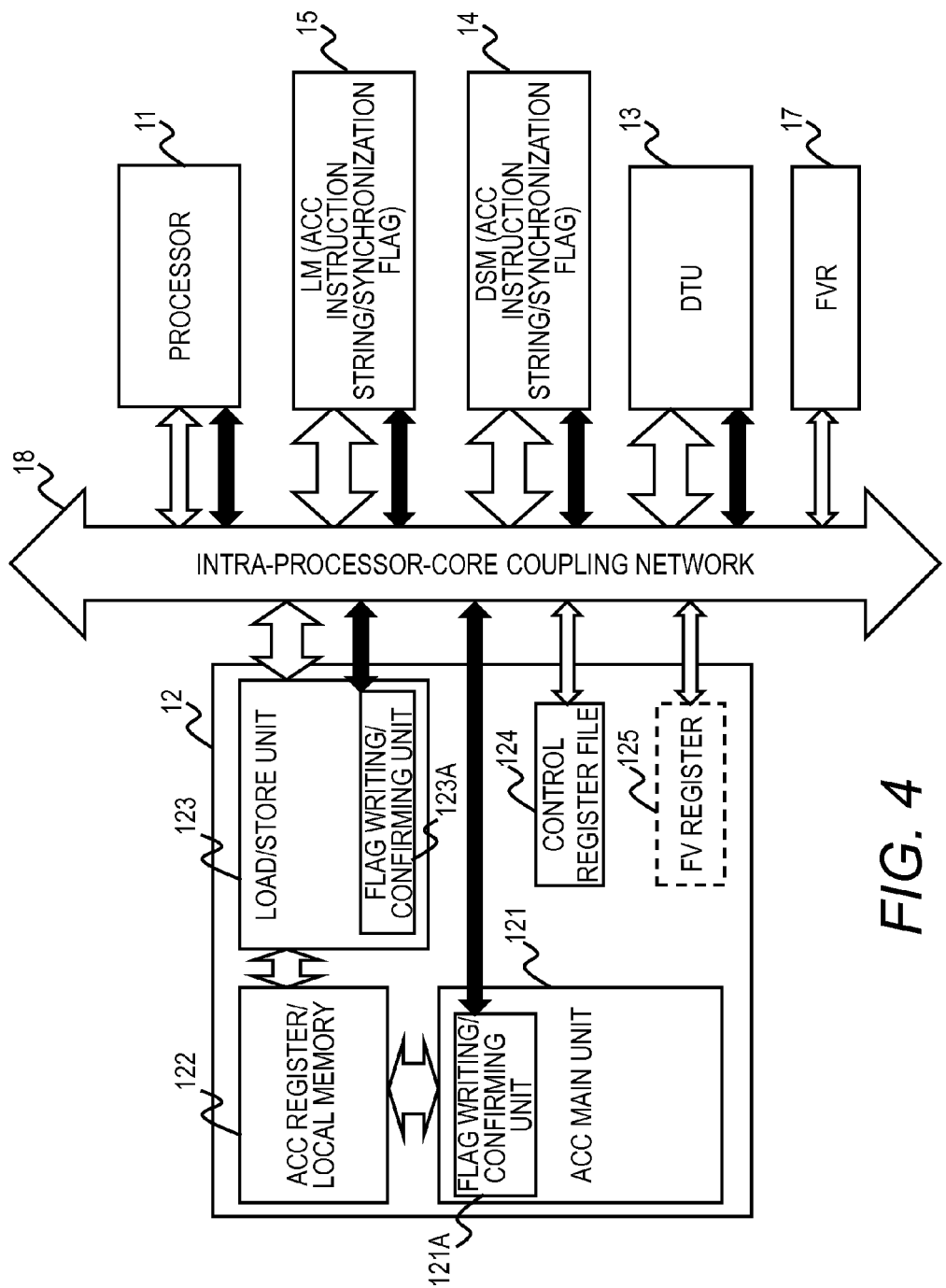
FIG. 4 is a diagram illustrating a third configuration example of the ACC and a configuration example of the processor core including the ACC according to the embodiment of this invention.

FIG. 4 is a diagram illustrating a third configuration example of the ACC 12 and a configuration example of the processor core including the ACC 12 according to the embodiment of this invention. It should be noted that, in the following description, the same components as those illustrated in FIG. 1 to FIG. 3 are denoted by the same reference numerals, and duplicate descriptions thereof are omitted appropriately.

The ACC 12 illustrated in FIG. 4 includes both the ACC main unit 121 including the flag writing/confirming unit 121A and the load/store unit 123 including the flag writing/confirming unit 123A.

In the ACC 12 having the above-mentioned configuration, the ACC main unit 121 and the load/store unit 123 autonomously operate in cooperation with each other. Further, the ACC main unit 121 and the load/store unit 123 also operate in cooperation with the processor 11 and the DTU 13. Such a cooperative operation is described in brief.

(Cooperative Operation 1 of ACC Main Unit 121 and Load/Store Unit 123)

First, as a first example of the cooperative operation of the ACC main unit 121 and the load/store unit 123, an operation in which the ACC main unit 121 starts processing when the load/store unit 123 finishes processing for reading the data within the LM 15 into the ACC register 122 is described. The load/store unit 123 executes processing for reading the data within the LM 15 into the ACC register 122. After that, the flag writing/confirming unit 123A writes the synchronization flag corresponding to the load processing into the predetermined address on the LM 15 or the DSM 14. Meanwhile, the flag writing/confirming unit 121A repeatedly checks whether or not the synchronization flag has been written into the LM 15 or the DSM 14. After that, when the flag writing/confirming unit 121A confirms the written synchronization flag, the ACC main unit 121 starts the own processing by using the data stored in the ACC register 122. In this manner, the ACC main unit 121 and the load/store unit 123 cooperatively operate.

(Cooperative Operation 2 of ACC Main Unit 121 and Load/Store Unit 123)

Next, as a second example of the cooperative operation of ACC main unit 121 and load/store unit 123, an operation in which when the ACC main unit 121 finishes the processing, the load/store unit 123 stores the processed data into the LM 15 is described.

When finishing predetermined processing, the ACC main unit 121 transmits the processing result data to the ACC register 122. After that, the flag writing/confirming unit 121A writes the synchronization flag corresponding to the predetermined processing into the predetermined address on the LM 15 or the DSM 14. Meanwhile, the flag writing/confirming unit 123A repeatedly checks whether or not the synchronization flag has been written into the LM 15 or the DSM 14. When the flag writing/confirming unit 123A confirms the written synchronization flag, the load/store unit 123 starts processing for transferring the data that is stored in the ACC register 122 to the LM 15 or the DSM 14. After that, the flag writing/confirming unit 123A writes the synchronization flag into the predetermined address on the DSM 14 on the own processor core or the other processor cores or the LM 15 designated by the instruction. In this manner, the ACC main unit 121 and the load/store unit 123 cooperatively operate.

As described above, in the ACC 12 of the third configuration example, the ACC main unit 121 and the load/store unit 123 cooperatively operate in synchronization with one another based on the flag setting/checking via the LM 15 or the DSM 14. It should be understood that the ACC main unit 121 and the load/store unit 123 can cooperatively operate in synchronization with the processor 11 and the DTU 13. Accordingly, while the ACC main unit 121 is executing the acceleration processing, the load/store unit 123 can read/ store data. Further, frequency/power supply voltage control (FV control) can be independently performed for each of the processor 11, the DTU 13, the ACC main unit 121, and the load/store unit 123.

Figure 5:
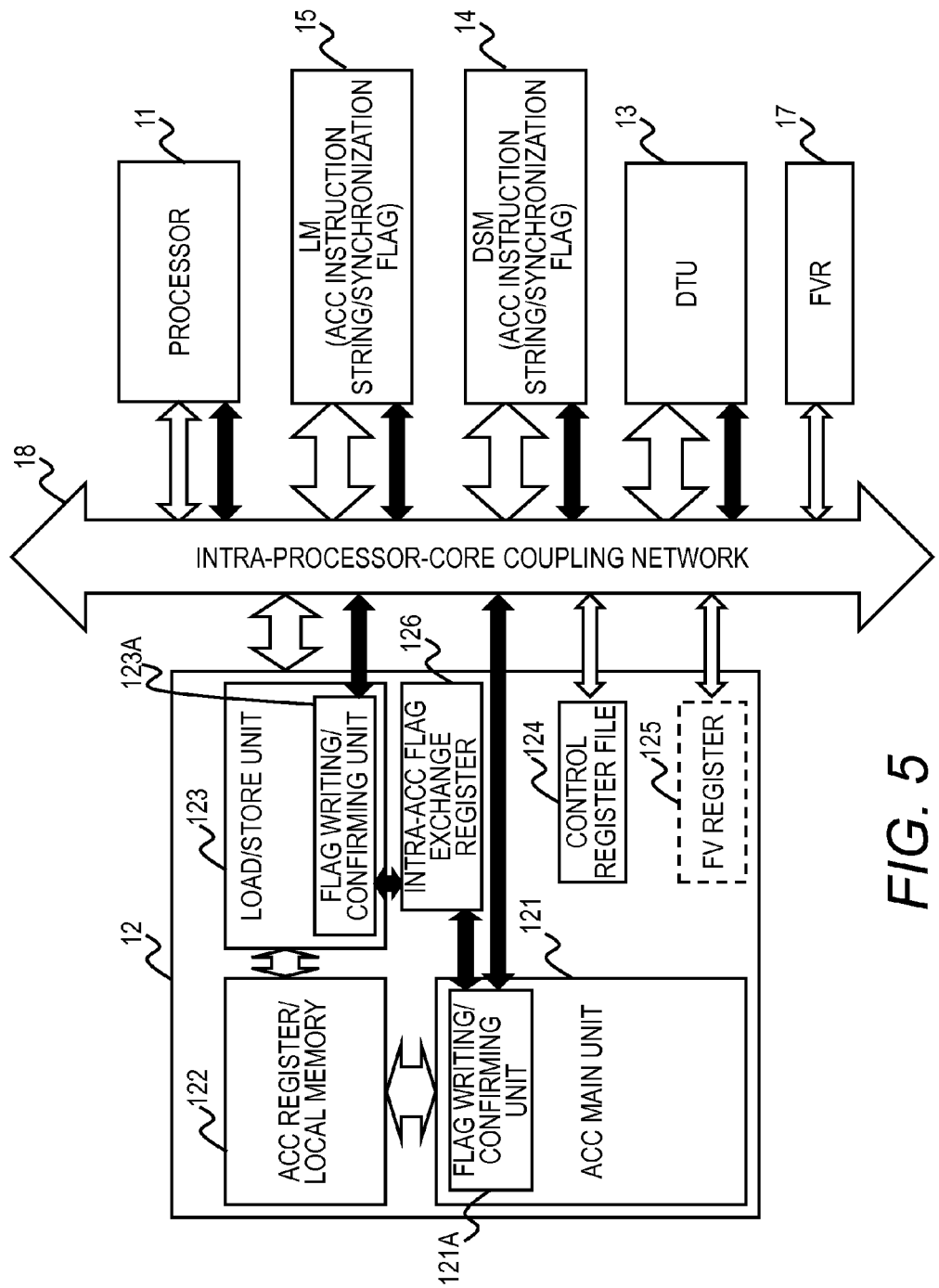
FIG. 5 is a diagram illustrating a fourth configuration example of the ACC and a configuration example of the processor core including the ACC according to the embodiment of this invention.

FIG. 5 is a diagram illustrating a fourth configuration example of the ACC 12 according to the embodiment of this invention and a configuration example of the processor core including the ACC 12. It should be noted that, in the following description, the same components as those illustrated in FIG. 4 are denoted by the same reference numerals, and duplicate descriptions thereof are omitted appropriately.

The ACC 12 illustrated in FIG. 5 is different from the ACC 12 illustrated in FIG. 4 in the aspect that the ACC 12 illustrated in FIG. 5 includes an intra-ACC flag exchange register 126.

The intra-ACC flag exchange register 126 is a register inside the ACC 12 used by the flag writing/confirming units 121A and 123A for setting and checking the synchronization flag.

In the ACC 12 having the above-mentioned configuration, the ACC main unit 121 and the load/store unit 123 autonomously operate in cooperation with each other. Further, the ACC main unit 121 and the load/store unit 123 also operate in cooperation with the processor 11 and the DTU 13. Such a cooperative operation is described in brief.

(Cooperative Operation 1 of ACC Main Unit 121 and Load/Store Unit 123)

First, as a first example of the cooperative operation of the ACC main unit 121 and the load/store unit 123, an operation in which the ACC main unit 121 starts processing when the load/store unit 123 finishes processing for reading the data within the LM 15 into the ACC register 122 is described.

The load/store unit 123 executes processing for reading the data within the LM 15 into the ACC register 122. After that, the flag writing/confirming unit 123A writes the synchronization flag corresponding to the load processing into the intra-ACC flag exchange register 126. Meanwhile, the ACC main unit 121 executes the other processing designated by the instruction, and when finishing the other processing, executes the flag checking instruction. Specifically, the flag writing/confirming unit 121A repeatedly checks whether or not the synchronization flag has been written into the intra-ACC flag exchange register 126. After that, when the flag writing/confirming unit 121A confirms the written synchronization flag, the ACC main unit 121 starts the own processing by using the data stored in the ACC register 122. When the own processing is finished, the processing result is stored into the ACC register 122. After that, when the flag setting instruction is executed, the value designated by the instruction is written into a location (address) designated by the instruction within the intra-ACC flag exchange register 126. In this manner, the ACC main unit 121 and the load/store unit 123 cooperatively operate.

(Cooperative Operation 2 of ACC Main Unit 121 and Load/Store Unit 123)

Next, as a second example of the cooperative operation of ACC main unit 121 and load/store unit 123, an operation in which when the ACC main unit 121 finishes the processing, the load/store unit 123 stores the processed data into the LM 15 is described.

When finishing predetermined processing, the ACC main unit 121 transmits the processing result data to the ACC register 122. After that, the flag writing/confirming unit 121A writes the synchronization flag corresponding to the predetermined processing into the intra-ACC flag exchange register 126. Meanwhile, the flag writing/confirming unit 123A repeatedly checks whether or not the synchronization flag has been written into the intra-ACC flag exchange register 126. When the flag writing/confirming unit 123A confirms the written synchronization flag, the load/store unit 123 starts processing for transferring the data that is stored in the ACC register 122 to the LM 15 or the DSM 14. In this manner, the ACC main unit 121 and the load/store unit 123 cooperatively operate.

As described above, in the ACC 12 of the fourth configuration example, the ACC main unit 121 and the load/store unit 123 cooperatively operate in synchronization with one another based on the flag setting/checking via the intra-ACC flag exchange register 126. Therefore, compared to the flag setting/checking via the LM 15 or the DSM 14 of the above-mentioned first to third configuration examples, it is possible to reduce overhead involved in the flag setting/checking.

Figure 6:
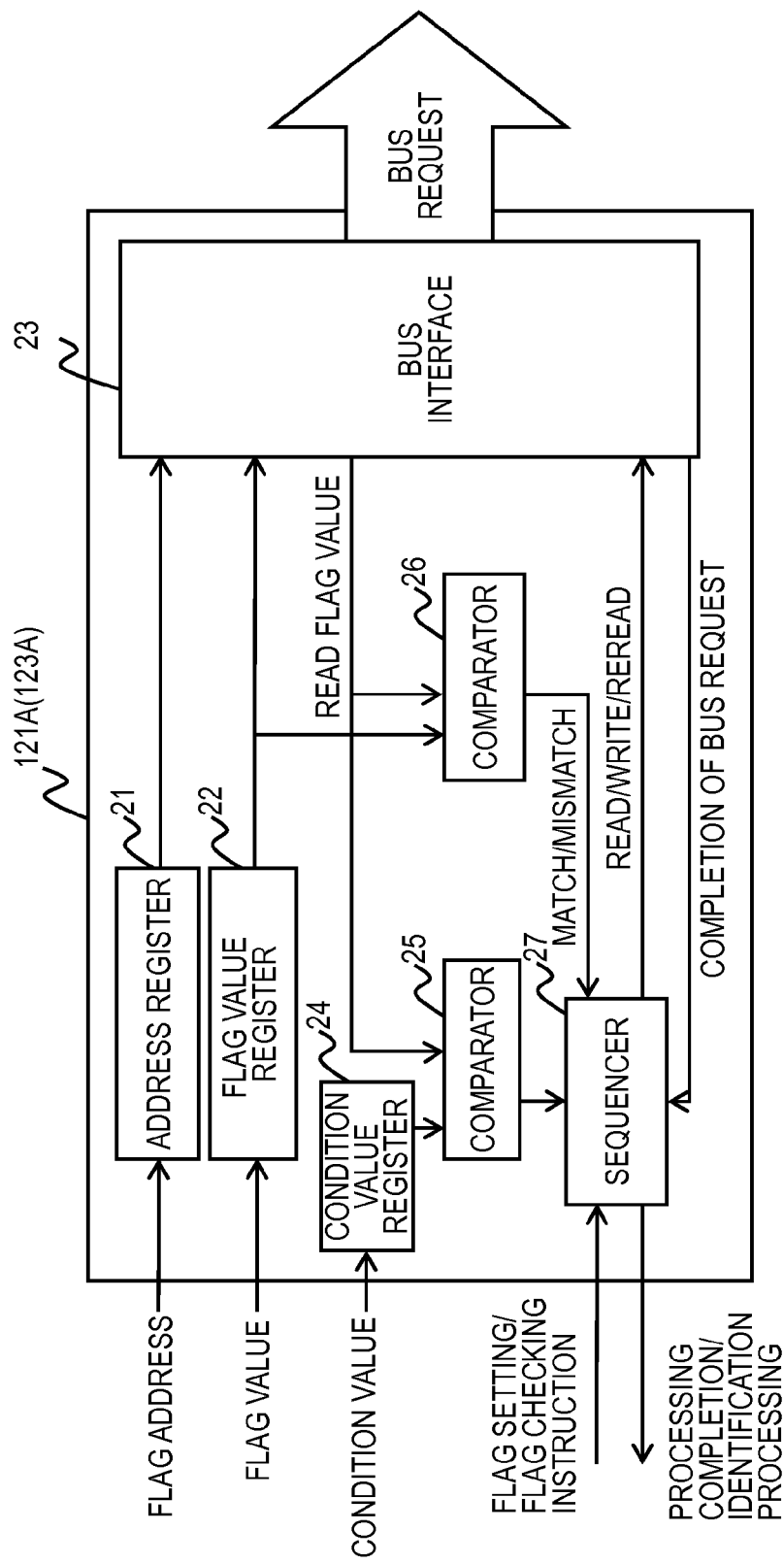
FIG. 6 is a diagram illustrating a configuration example of the flag writing/confirming unit according to the embodiment of this invention.

FIG. 6 is a diagram illustrating a configuration example of the flag writing/confirming unit 121A (123A) according to the embodiment of this invention. As illustrated in FIG. 6, the flag writing/confirming unit 121A includes an address register 21, a flag value register 22, a bus interface 23, a condition value register 24, comparators 25 and 26, and a sequencer 27.

The operation of the flag writing/confirming unit 121A (123A) can be divided into an operation for writing the synchronization flag (flag setting) and an operation for confirming the synchronization flag (flag checking), and hence each of those operations is described.

(Flag Setting)

The flag writing/confirming unit 121A writes the synchronization flag into the predetermined address on the memory such as the LM 15 or the DSM 14. Specifically, the processor 11 inputs, to the flag writing/confirming unit 121A, a flag address (address on the memory into which the synchronization flag is to be written), a flag value (value of the synchronization flag to be written), and an instruction for flag setting, and the flag writing/confirming unit 121A operates in accordance with the instruction.

With this operation, the flag address and the flag value are written into the address register 21 and the flag value register 22, respectively. Further, the instruction for the flag setting is written into the sequencer 27. The bus interface 23 issues a bus request based on the input information, and writes the designated value of the synchronization flag into the designated address on the memory.

(Flag Checking)

On the other hand, the flag writing/confirming unit 121A confirms the synchronization flag set in the predetermined address on the memory such as the LM 15 or the DSM 14. Specifically, the flag writing/confirming unit 121A first inputs a flag address (address on the memory to be confirmed), a flag value (value of the synchronization flag to be confirmed), and an instruction for flag checking.

With this operation, the flag address and the flag value are written into the address register 21 and the flag value register 22, respectively. Further, the instruction for the flag checking is written into the sequencer 27. The bus interface 23 issues the bus request based on the flag address and the instruction for the flag checking within the input information, and reads the value of the synchronization flag stored in the designated address on the memory.

The flag value (hereinafter referred to as "read flag value") read by the bus interface 23 is sent to the comparator 26. The comparator 26 compares the read flag value and the flag value within the flag value register 22. When both match, an indication of the match is output to the sequencer 27, and when both mismatch, an indication of the mismatch is output to the sequencer 27. When a result output from the comparator 26 indicates a mismatch, the sequencer 27 requests the bus interface 23 to reread the flag value. On the other hand, when the result output from the comparator 26 indicates a match, it is notified that the processing has been completed.

On the other hand, to examine whether or not the value of the synchronization flag matches a predetermined condition value, the processor 11 further inputs the condition value of the synchronization flag to the flag writing/confirming unit 121A. An instruction for specific processing can be notified by designating the condition value. The specific processing here represents processing executed when the value of the synchronization flag is the condition value, and examples thereof include processing based on the value within the control register file 124 illustrated in FIG. 2. With this operation, the condition value of the synchronization flag is written into the condition value register 24. In this case, the read flag value read by the bus interface 23 is sent to the comparator 25. The comparator 25 compares the read flag value with the condition value stored in the condition value register 24. When both match, an indication of the match is output to the sequencer 27. Further, when both mismatch, an indication of the mismatch is output to the sequencer 27. When a result output from the comparator 25 indicates a mismatch, the sequencer 27 requests the bus interface 23 to reread the flag value. On the other hand, when the result output from the comparator 25 indicates a match, the instruction for the specific processing is notified.

To supplement the description, in order to write the synchronization flag into the predetermined address on the memory such as the LM 15 or the DSM 14, the flag writing/confirming unit 121A can write a large number of synchronization flags by changing the address to which the synchronization flag is to be written. In other words, the flag writing/confirming unit 121A can write (output) a plurality of different flags indicating the progress into the synchronization flag area in accordance with progress of the processing executed by the ACC 12. Each of the flags is associated with processing to be executed by the processor 11 or the DTU 13 subsequently to the processing executed by the ACC 12. Accordingly, for example, the processor 11 can start the processing which is associated with the flag written in the synchronization flag area by the ACC 12 and is to be subsequently executed. It should be noted that the processor 11 and the DTU 13 can also write a plurality of different flags indicating the progress into the synchronization flag area in accordance with the progress of the processing executed by the processor 11 and the DTU 13 themselves.

Figures 7, 8:
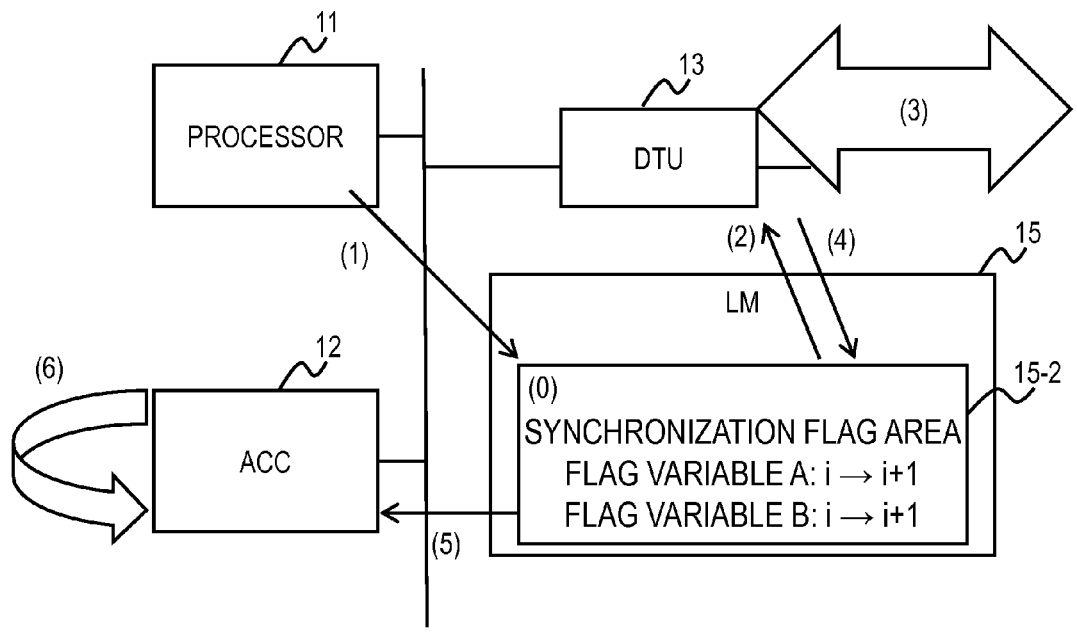
FIG. 7 is a diagram illustrating an outline of an operation for the flag setting/checking performed by the flag writing/confirming unit according to the embodiment of this invention.
FIG. 8 is a diagram illustrating a reference example of a program executed in the multi-core processor system according to the embodiment of this invention.

FIG. 7 is a diagram illustrating an outline of an operation for the flag setting/checking performed by the flag writing/confirming unit 121A (123A) according to the embodiment of this invention. Here, the operation of the flag setting/checking into seven stages is divided and described.

Stage (0) is a stage for an initial setting. In other words, in the synchronization flag area 15-2 of the LM 15, memory areas for a flag variable A and a flag variable B are reserved. The values of the flag variables A and B are initialized to i (i=0 or the like) in advance.

In stage (1), the processor 11 writes (i+1) as the value of the flag variable A. In stage (2), before and after stage (1), the DTU 13 repeatedly checks whether or not the value of the flag variable A has changed to (i+1).

In stage (3), when the value of the flag variable A has changed to (i+1), the DTU 13 executes the data transfer. In stage (4), when the data transfer is finished, the DTU 13 writes (i+1) as the value of the flag variable B.

In stage (5), before and after stage (4), the ACC 12 repeatedly checks whether or not the value of the flag variable B has changed to (i+1). In stage (6), when the value of the flag variable B has changed to (i+1), the ACC 12 executes the acceleration processing to be executed by itself.

As described above, the processor 11 and the DTU 13 cooperatively operate via the flag variable A. In the same manner, the DTU 13 and the ACC 12 cooperatively operate via the flag variable B. In other words, the processor 11, the ACC 12, and the DTU 13 cooperatively operate via the flag variables A and B stored in the synchronization flag area 15-2 of the LM 15.

It should be noted that the flag variables A and B may be stored in the DSM 14, the on-chip centralized shared memory 40, or the off-chip centralized shared memory 50 instead of the LM 15. For example, the DTU 13 of the processor core 10-1 may write the synchronization flag into the synchronization flag area 40-2 of the on-chip centralized shared memory 40. In this case, the DTUs 13 of the other processor cores 10-2 through 10-n examine the synchronization flag written in the synchronization flag area 40-2. Accordingly, the different processor cores 10-1 through 10-n operate in cooperation with one another via flag variables.

FIG. 8 is a diagram illustrating a reference example of a program executed in the multi-core processor system 1 according to the embodiment of this invention. Here, a program executed by a related-art method is described at first.

In a program 80 illustrated in FIG. 8, an outer for loop is a loop sentence for controlling the DTU 13 to read data and store processing result data obtained from an inner for loop. On the other hand, the inner for loop is a loop sentence for controlling the ACC 12 to execute the acceleration processing for the data read by the outer for loop.

A DTU load sentence within the outer for loop is an instruction sentence for controlling the DTU 13 to read data having an amount that can be processed by the ACC 12 from the off-chip centralized shared memory 50 into the LM 15. An accelerator load sentence within the inner for loop is an instruction sentence for controlling the ACC 12 to read a part of the data read into the LM 15 further into the ACC register 122. An arithmetic operation sentence is an instruction sentence for controlling the ACC 12 to perform the arithmetic operation by using the data read by the accelerator load sentence. An accelerator store sentence is an instruction sentence for controlling the ACC 12 to store an arithmetic operation result of the arithmetic operation sentence into the LM 15. A sentence of preparation for the next loop is an instruction sentence for processing for preparation for the next loop (such as a calculation of a base address of the next piece of data and an arithmetic operation of a loop counter). A DTU store sentence within the outer for loop is an instruction sentence for controlling the DTU 13 to store arithmetic operation result data stored in the LM 15 into the off-chip centralized shared memory 50. In the program illustrated in FIG. 8, it is assumed that the LM 15 is used as the memory for storing the data to be processed by the ACC and the data that has been processed by the ACC, but it should be understood that the DSM 14 may be used instead of the LM 15. Specifically, the LM 15 can be used for data used in local by the processor core (for example, processor core 10-1) including the LM 15, while the DSM 14 can be used for data shared with other processor cores 10-1 through 10-n. It should be noted that the LM 15 and the DSM 14 are used appropriately by the compiler.

Figure 9:
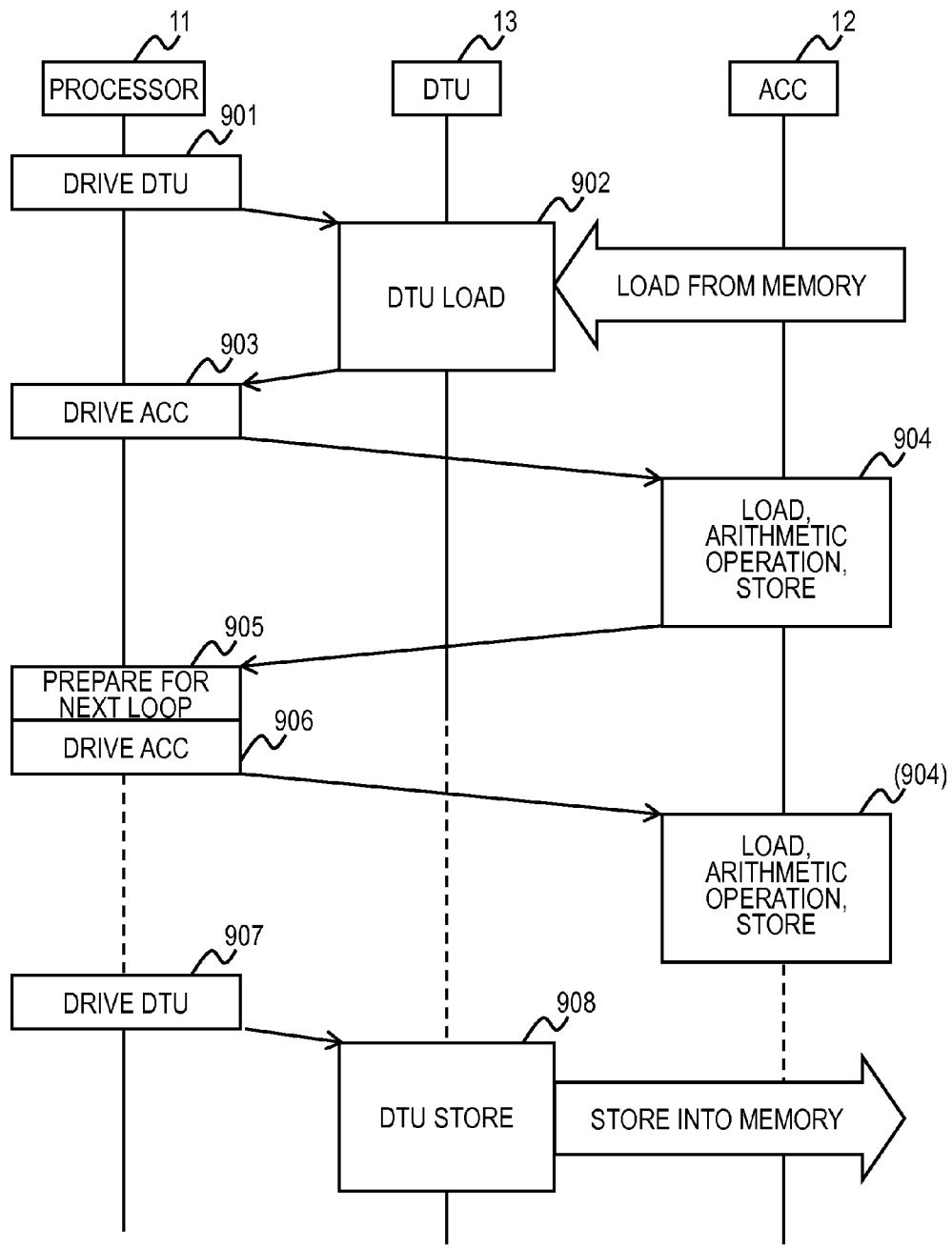
FIG. 9 is a diagram illustrating a flow of processing when the program is executed according to the reference example.

FIG. 9 is a diagram illustrating a flow of processing when the program is executed according to the reference example.

First, in Step 901, the processor 11 issues a drive instruction to the DTU 13 (901). Then, in Step 902, the DTU 13 starts driving to read the data having the amount that can be processed by the ACC 12 from the off-chip centralized shared memory 50 into the LM 15 (902). When finishing the load processing, the DTU 13 notifies the processor 11 that the load processing has been finished.

In Step 903, the processor 11, which has received the notification from the DTU 13, issues the drive instruction to the ACC 12 (903). Then, in Step 904, the ACC 12 starts driving to perform the arithmetic operation by using a part of the data read in Step 902 and store the arithmetic operation result into the LM 15 (904). When finishing a series of processing, the ACC 12 notifies the processor 11 that the processing has been finished.

In Step 905, the processor 11, which has received the notification from the ACC 12, executes the preparation for the next loop of the processing (905). After that, in Step 906, the processor 11 issues the drive instruction to the ACC 12 (906). After that, the processing of Steps 903 to 906 is repeated by the number of loops of the inner for loop.

When finishing the loop processing of the inner for loop, in Step 907, the processor 11 issues the drive instruction to the DTU 13 (907). Then, in Step 908, the DTU 13 starts driving to store the arithmetic operation result data stored in the LM 15 into the off-chip centralized shared memory 50. After that, the processing of the processing of Steps 901 through 908 is repeated by the number of loops of the outer for loop.

As described above, by the related-art method, the processing of the processor 11, the processing of the DTU 13, and the processing of the ACC 12 are serially executed without an overlap. Further, the operations of the DTU 13 and the ACC 12 are controlled by the processor 11.

Figure 10:
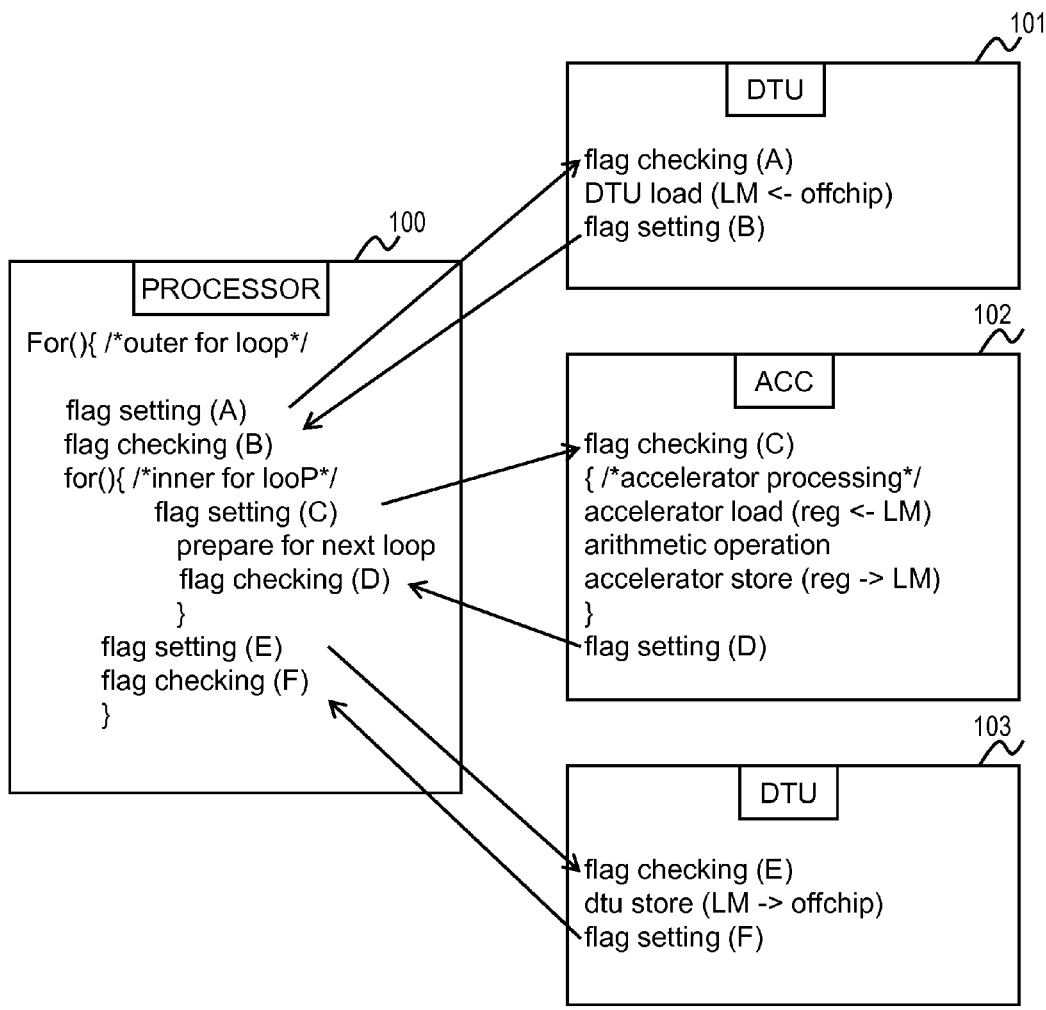
FIG. 10 is a diagram illustrating a first example of a program executed in the multi-core processor system according to the embodiment of this invention.

FIG. 10 is a diagram illustrating a program according to a first example executed in the multi-core processor system 1 according to the embodiment of this invention.

As illustrated in FIG. 10, the program according to the first example includes a program 100 executed by the processor 11, programs 101 and 103 executed by the DTU 13, and a program 102 executed by the ACC 12. In other words, the program 80 executed by the related-art method illustrated in FIG. 8 is divided into the program 100 executed by the processor 11, the programs 101 and 103 executed by the DTU 13, and the program 102 executed by the ACC 12 after being converted for the processor core according to the embodiment of this invention (adding thereto a flag setting sentence, a flag checking sentence, and the like).

It should be noted that each of the programs 100, 101, 102, and 103 includes the flag setting sentence and the flag checking sentence. The flag checking sentence is an instruction sentence for repeatedly examining the value of a synchronization flag variable (for example, A) written in the predetermined address on the memory such as the LM 15 or the DSM 14 until the value matches a comparative value set in advance. When the flag is written into the synchronization flag variable, the procedure advances to the instruction sentences subsequent to the instruction sentence corresponding to the flag. On the other hand, the flag setting sentence is an instruction sentence for writing the flag into the predetermined address on the memory such as the LM 15 or the DSM 14, and specifically, writing data into the synchronization flag variable (updating the data written as the synchronization flag variable). After the flag is written, the procedure advances to the subsequent instruction sentences.

Further, the respective programs 100, 101, 102, and 103 are each generated by the parallelizing compiler described later in advance, and are each located in the predetermined address on the memory such as the LM 15 or the DSM 14, namely, the instruction area 15-1, 14-1, or the like.

It should be noted that the DTU 13 and the ACC 12 are activated when the processor 11 writes the data into the control register file 124 or when the multi-core processor system 1 is booted. After that, each of the DTU 13 and the ACC 12 autonomously executes the program independently of the processor 11. For example, in accordance with the program 102, the ACC 12 first executes the flag checking sentence, and when the flag is written into a flag variable C, executes the instruction sentences subsequent to the instruction sentence corresponding to the written flag.

Figure 11:
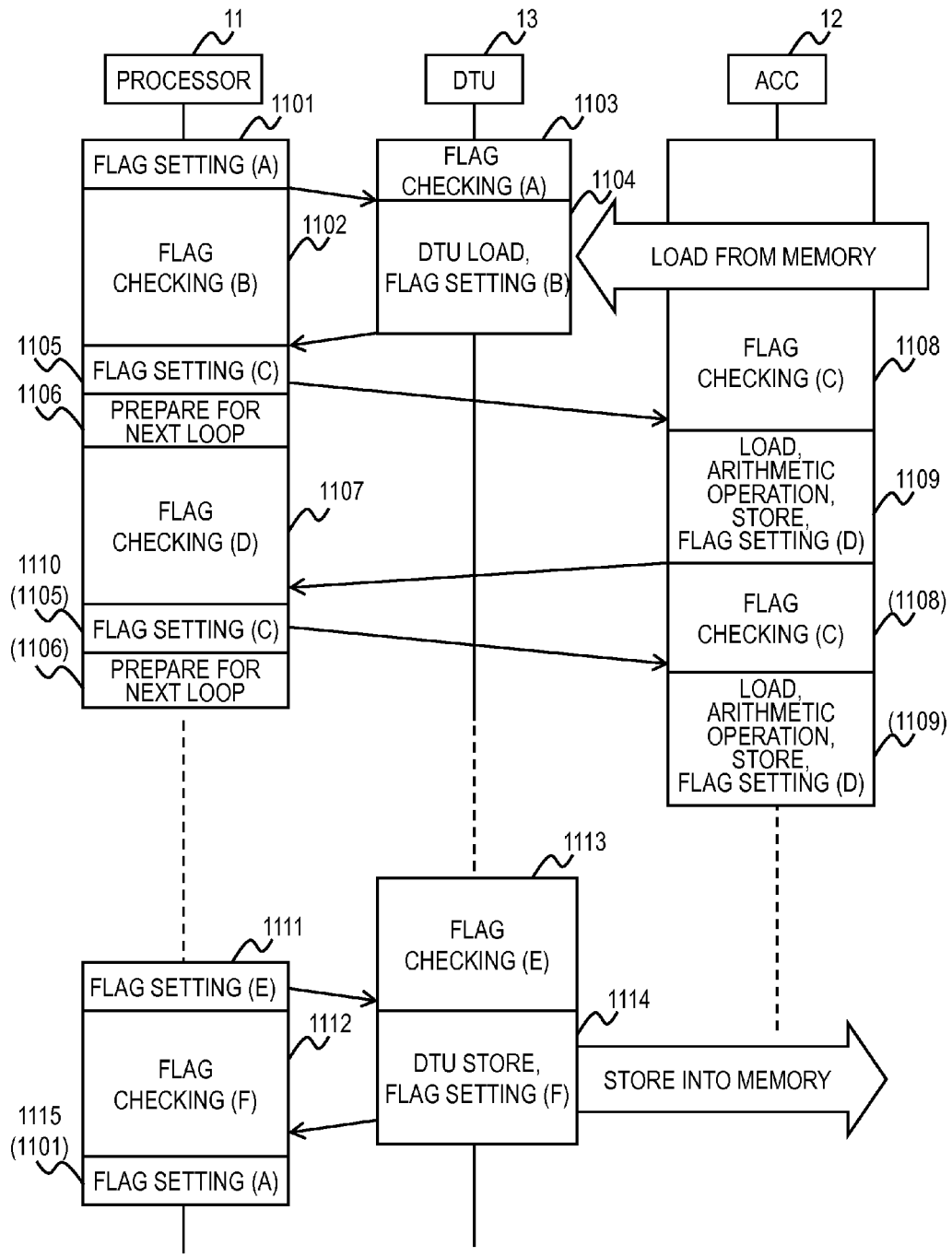
FIG. 11 is a diagram illustrating a flow of the processing when the program is executed according to the first example.

FIG. 11 is a diagram illustrating a flow of the processing when the program is executed according to the first example.

First, in Step 1101, the processor 11 operates in accordance with the program 100, and enters the loop of the outer for loop to write the flag into the flag variable A (1101). After that, in Step 1102, the processor 11 confirms the flag variable B (1102).

On the other hand, in Step 1103, the DTU 13 operates in accordance with the program 101, and confirms the flag variable A (1103). When the flag is written into the flag variable A in Step 1101, the DTU 13 starts reading data, and when finishing reading the data, writes the flag into the flag variable B (1104). At this time, the flag written in the flag variable A is returned (reset) to an initial state.

In Step 1105, when the flag is written into the flag variable B in Step 1104, the processor 11 confirms that the flag value is a predetermined value, and enters the loop of the inner for loop to write the flag into the flag variable C (1105). After that, the processor 11 executes the preparation for the next loop (1106), and confirms a flag variable D (1107).

On the other hand, in Step 1108, the ACC 12 operates in accordance with the program 102, and confirms the flag variable C (1108). When the flag is written into the flag variable C in Step 1105, the ACC 12 confirms that the flag value is a predetermined value, starts executing the acceleration processing, and when finishing the acceleration processing, writes the flag into the flag variable D (1109). At this time, the flag written in the flag variable C is returned to an initial state.

In Step 1110, when the flag is written into the flag variable D by the processing of Step 1109, the processor 11 enters the next loop of the inner for loop to write the flag into the flag variable C (1110). At this time, the flag written in the flag variable D is returned to an initial state. After that, the processing of Steps 1106 through 1110 is repeated.

In Step 1111, when the loop processing for the inner for loop is finished, the processor 11 writes the flag into a flag variable E (1111). After that, the processor 11 confirms a flag variable F (1112). On the other hand, in Step 1113, the DTU 13 operates in accordance with the program 103, and confirms the flag variable E (1113). When the flag is written into the flag variable E in Step 1111, the DTU 13 starts storing the data, and when finishing storing the data, writes the flag into the flag variable F (1114). At this time, the flag written in the flag variable E is returned to an initial state. In Step 1115, when the flag is written into the flag variable F by the processing of Step 1114, the processor 11 enters the next loop of the outer for loop to write the flag into the flag variable A (1115). At this time, the flag written in the flag variable F is returned to an initial state. After that, the processing of Steps 1102 to 1115 is repeated.

As described above with reference to the above-mentioned processing, the processor 11, the ACC 12, and the DTU 13 each autonomously operate in synchronization with one another via the flag setting and the flag checking. According to the program of the first example, the processor 11 can execute the processing of Step 1106 during the processing of the ACC 12 illustrated in Step 1109. In other words, the processing of the processor 11 and the processing of the ACC 12 can be caused to overlap each other. Therefore, a start time of the preparation for the next loop (processing of Step 1106) can be brought forward. In other words, the overhead for the control of the ACC 12 performed by the processor 11 can be covered up.

Further, the ACC 12 operates in accordance with the program 102 stored in the LM 15 or the DSM 14, which eliminates the need to extend an instruction set. In other words, it is possible to add an arbitrary ACC 12 to an arbitrary processor 11 without extending the instruction set.

It should be noted that the program of the first example repeats the loop processing of the outer for loop and the inner for loop. Therefore, the program may be configured to write the flag value corresponding to a repeat count each time the loop processing is repeated. For example, in the n-th round of the loop processing indicated by the inner for loop, flag values (for example, Cn and Dn) associated with the number n are written as synchronization flag variables C and D and confirmed. This can reduce the overhead for returning the flag value into the initial state.

Further, the program may be configured to change the clock frequency to a low frequency, interrupt the clock frequency, or perform other such operation during a period until a predetermined time has passed based on the value set in the FVR 125 when the flag checking sentence is executed. This can reduce the power consumption involved in the flag checking.

Figure 12:
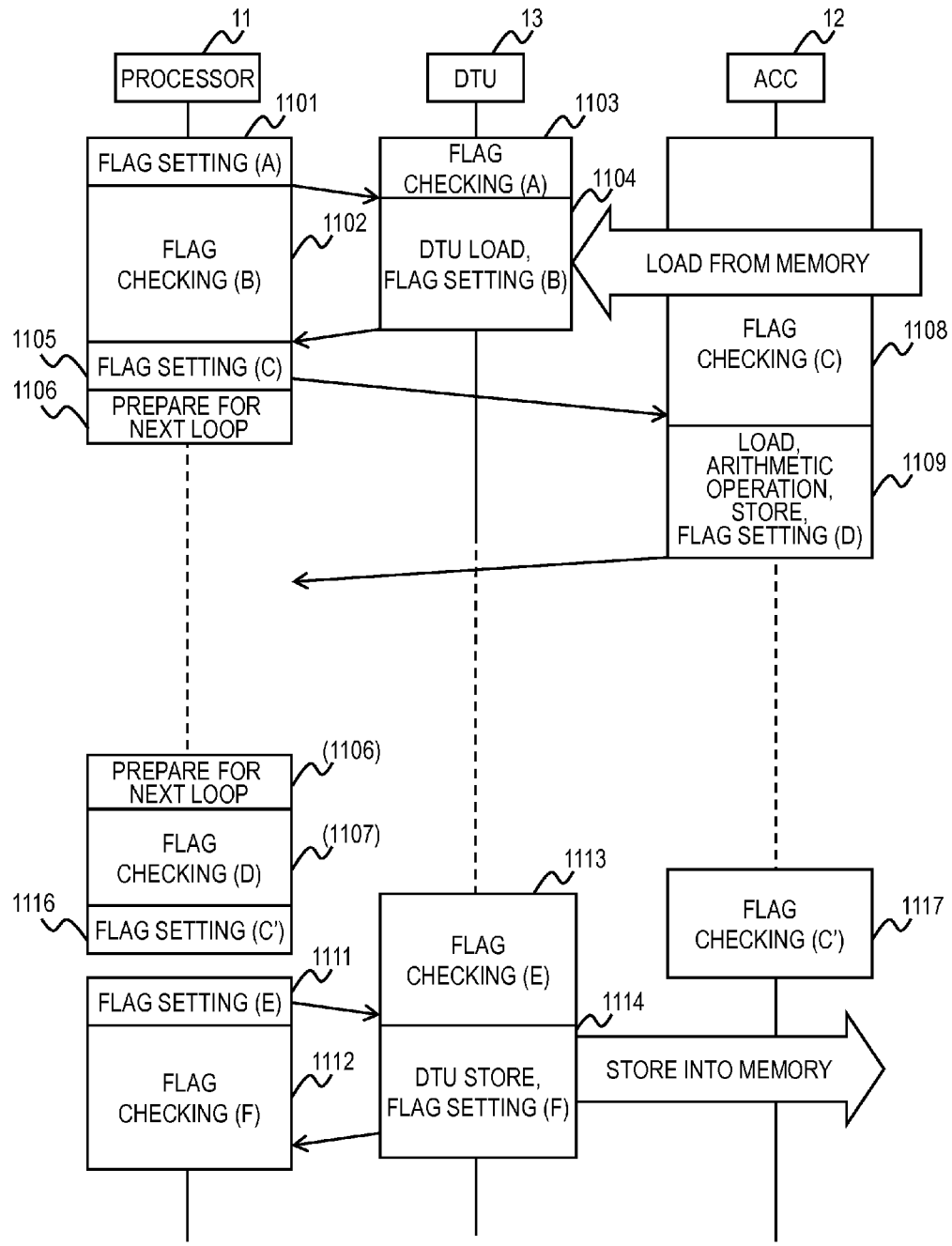
FIG. 12 is a diagram illustrating a modification example of the flow of the processing when the program is executed according to the first example.

FIG. 12 is a diagram illustrating a modification example of the flow of the processing when the program is executed according to the first example.

Here, as the modification example of the flow of the processing illustrated in FIG. 11, processing in which the processor 11 writes the flag into a flag variable C' when a predetermined condition is satisfied (when the number of condition branches or loops reaches a fixed number), while the ACC 12 executes an operation corresponding to the flag written in the flag variable C' is described. It should be noted that the programs for the processor 11 and the ACC 12 for executing such processing are generated by the parallelizing compiler described later in advance, and are each located in the predetermined address on the memory such as the LM 15 or the DSM 14.

In Step 1116, when a predetermined condition is satisfied (when the number of condition branches or loops reaches a fixed number) during execution of the loop processing of the inner for loop, the processor 11 writes the condition value as the flag into the flag variable C' (1116). The condition value represents a value for notifying the instruction for the specific processing as described above. On the other hand, the ACC 12 confirms the flag variable C' (1117). When the condition value is written into the flag variable C' in Step 1115, the ACC 12 starts a special operation. The special operation represents an operation for, for example, reading the control register file 124 and executing the next task indicated by the read value.

As described above with reference to the above-mentioned processing, the processor 11, the ACC 12, and the DTU 13 autonomously operate in synchronization with one another via the flag setting and the flag checking. In addition, according to the program of the modification example, even in a case where the ACC 12 is executing the acceleration processing, when the processor 11 satisfies a predetermined condition, a change can be made to control the ACC 12 to perform the special operation. In other words, it is possible to perform dynamic scheduling.

Figure 13:
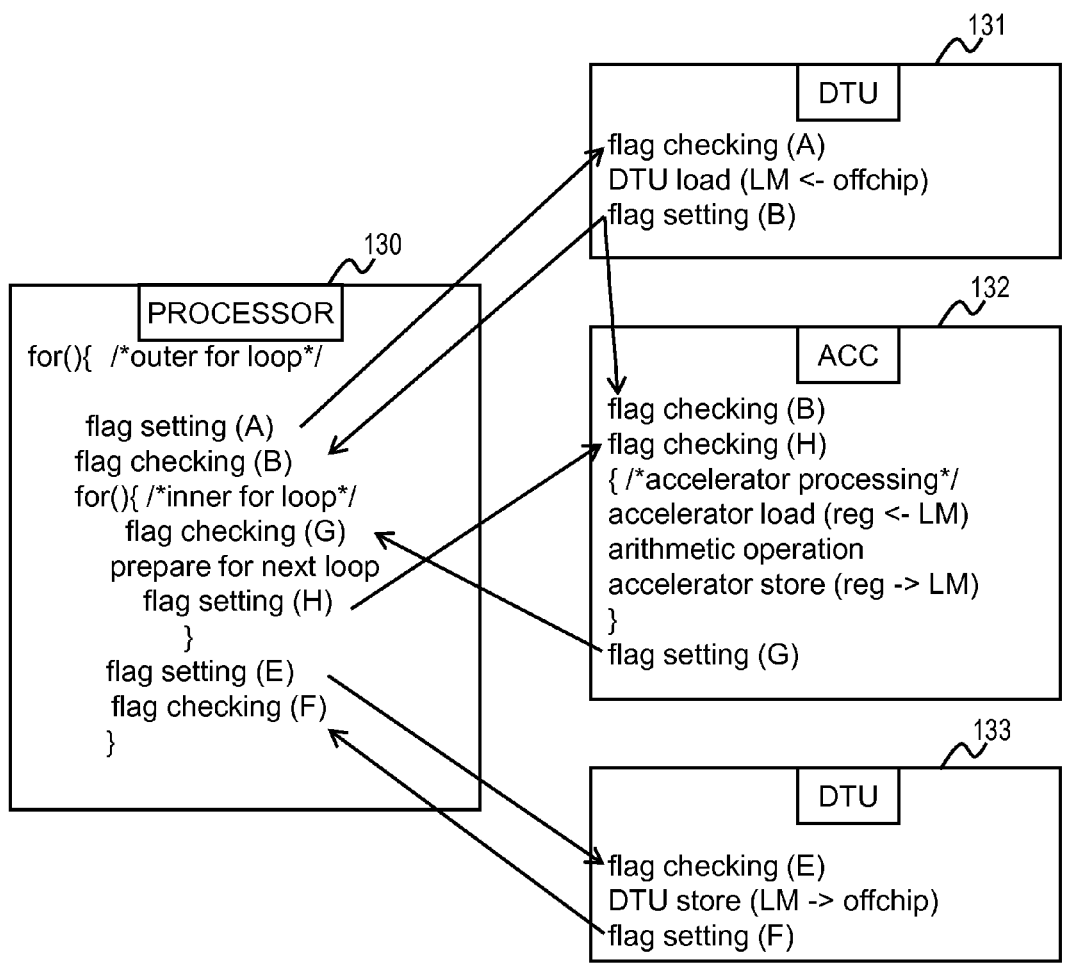
FIG. 13 is a diagram illustrating a program according to a second example executed in the multi-core processor system according to the embodiment of this invention.

FIG. 13 is a diagram illustrating a program according to a second example executed in the multi-core processor system 1 according to the embodiment of this invention.

As illustrated in FIG. 13, the program according to the second example includes a program 130 executed by the processor 11, programs 131 and 133 executed by the DTU 13, and a program 132 executed by the ACC 12. In other words, the program 80 illustrated in FIG. 8 is divided into the program 130 executed by the processor 11, the programs 131 and 133 executed by the DTU 13, and the program 132 executed by the ACC 12 after being converted for the processor core according to the embodiment of this invention (adding thereto a flag setting sentence, a flag checking sentence, and the like).

It should be noted that each of programs 130, 131, 132, and 133 includes the flag setting sentence and the flag checking sentence that have different form from the form illustrated in FIG. 10. In other words, the end (flag setting (H)) of the processing of the inner for loop performed by the processor 11 determines the execution start (flag checking (H)) of the acceleration processing performed by the ACC 12. On the other hand, the end (flag setting (G)) of the processing of the acceleration processing performed by the ACC 12 determines the execution start (flag checking (G)) of the processing of the inner for loop performed by the processor 11.

The respective programs 130, 131, 132, and 133 are each generated by the parallelizing compiler described later in advance, and are each located in the predetermined address on the memory such as the LM 15 or the DSM 14.

Figure 14:
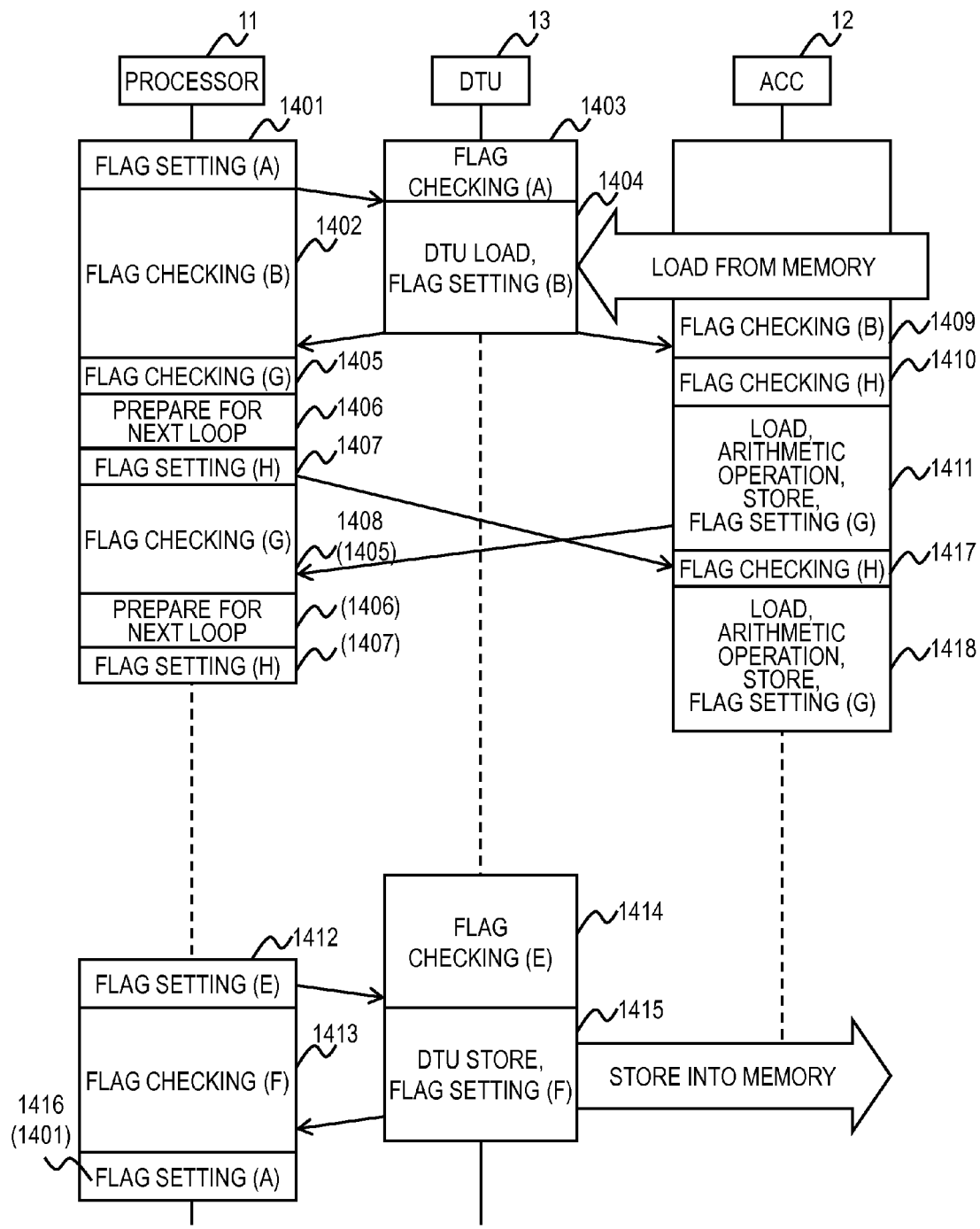
FIG. 14 is a diagram illustrating a flow of the processing when the program is executed according to the second example.

FIG. 14 is a diagram illustrating a flow of the processing when the program is executed according to the second example.

First, in Step 1401, the processor 11 operates in accordance with the program 130, and enters the loop of the outer for loop to write the flag into the flag variable A (1401). After that, in Step 1402, the processor 11 confirms the flag variable B (1402).

On the other hand, in Step 1403, the DTU 13 operates in accordance with the program 131, and confirms the flag variable A (1403). When the flag is written into the flag variable A in Step 1401 and confirmed, the DTU 13 starts reading data, and when finishing reading the data, writes the flag into the flag variable B (1404). At this time, the flag written in the flag variable A is returned (reset) to an initial state.

When the flag is written into the flag variable B in Step 1404, the processor 11 enters the loop of the inner for loop to confirm the flag variable G (1405). Here, it is assumed that the flag is written in the flag variable G as an initial setting. After that, the processor 11 executes the preparation for the next loop (1406), and writes a flag into a flag variable H (1107). At this time, the flag written in the flag variable G is returned to an initial state. After that, the processor 11 enters the next loop of the outer for loop to confirm the flag variable G (1408). After that, the processing of Steps 1406 through 1408 is repeated.

On the other hand, in Step 1409, the ACC 12 operates in accordance with the program 132, and confirms the flag variable B (1409). When the flag is written into the flag variable B in Step 1404, the ACC 12 confirms the flag variable H (1410). Here, it is assumed that the flag is written in the flag variable H as an initial setting. After that, the ACC 12 starts executing the acceleration processing, and when finishing the acceleration processing, writes the flag into the flag variable G (1411). At this time, the flag written in the flag variable H is returned to an initial state. After that, the processing of Steps 1410 through 1411 is repeated.

In Step 1412, when the loop processing for the inner for loop is finished, the processor 11 writes the flag into a flag variable E (1412). After that, the processor 11 confirms a flag variable F (1413). On the other hand, in Step 1414, the DTU 13 operates in accordance with the program 133, and confirms the flag variable E (1414). When the flag is written into the flag variable E in Step 1412, the DTU 13 starts storing the data, and when finishing storing the data, writes the flag into the flag variable F (1415). At this time, the flag written in the flag variable E is returned to an initial state.

In Step 1416, when the flag is written into the flag variable F by the processing of Step 1415, the processor 11 enters the next loop of the outer for loop to write the flag into the flag variable A (1416). At this time, the flags written in the flag variables F and B are returned to an initial state. After that, the processing of Steps 1402 through 1416 is repeated.

As described above with reference to the above-mentioned processing, the processor 11, the ACC 12, and the DTU 13 autonomously operate in synchronization with one another via the flag setting and the flag checking. According to the program of the second example, the processor 11 can execute the processing of Step 1406 during the processing of the ACC 12 illustrated in Step 1411. In other words, the processing of the processor 11 and the processing of the ACC 12 can be caused to overlap each other.

Further, by the processing of Step 1407, the processor 11 can trigger the control of the ACC 12 prior to the processing of Steps 1417 and 1418 performed by the ACC 12. Therefore, the start time of the preparation for the next loop (Step 1406) can be brought forward by a period corresponding to the flag checking/setting performed by the processor 11. In other words, the overhead for the control of the ACC 12 performed by the processor 11 can be covered up.

It should be noted that the program of the second example repeats the loop processing of the outer for loop and the inner for loop in the same manner as in the program of the first example. Therefore, the program may be configured to write the flag value corresponding to the repeat count each time the loop processing is repeated. For example, in the n-th round of the loop processing indicated by the inner for loop, a flag value (for example, Hn) associated with the number n is written as a synchronization flag variable H and confirmed. This can reduce the overhead for returning the flag value into the initial state.

Further, the program may be configured to change the clock frequency to a low frequency, interrupt the clock frequency, or perform other such operation during a period until a predetermined time has passed based on the value set in the FVR 125 when the flag checking sentence is executed. This can reduce the power consumption involved in the flag checking.

Figure 15:
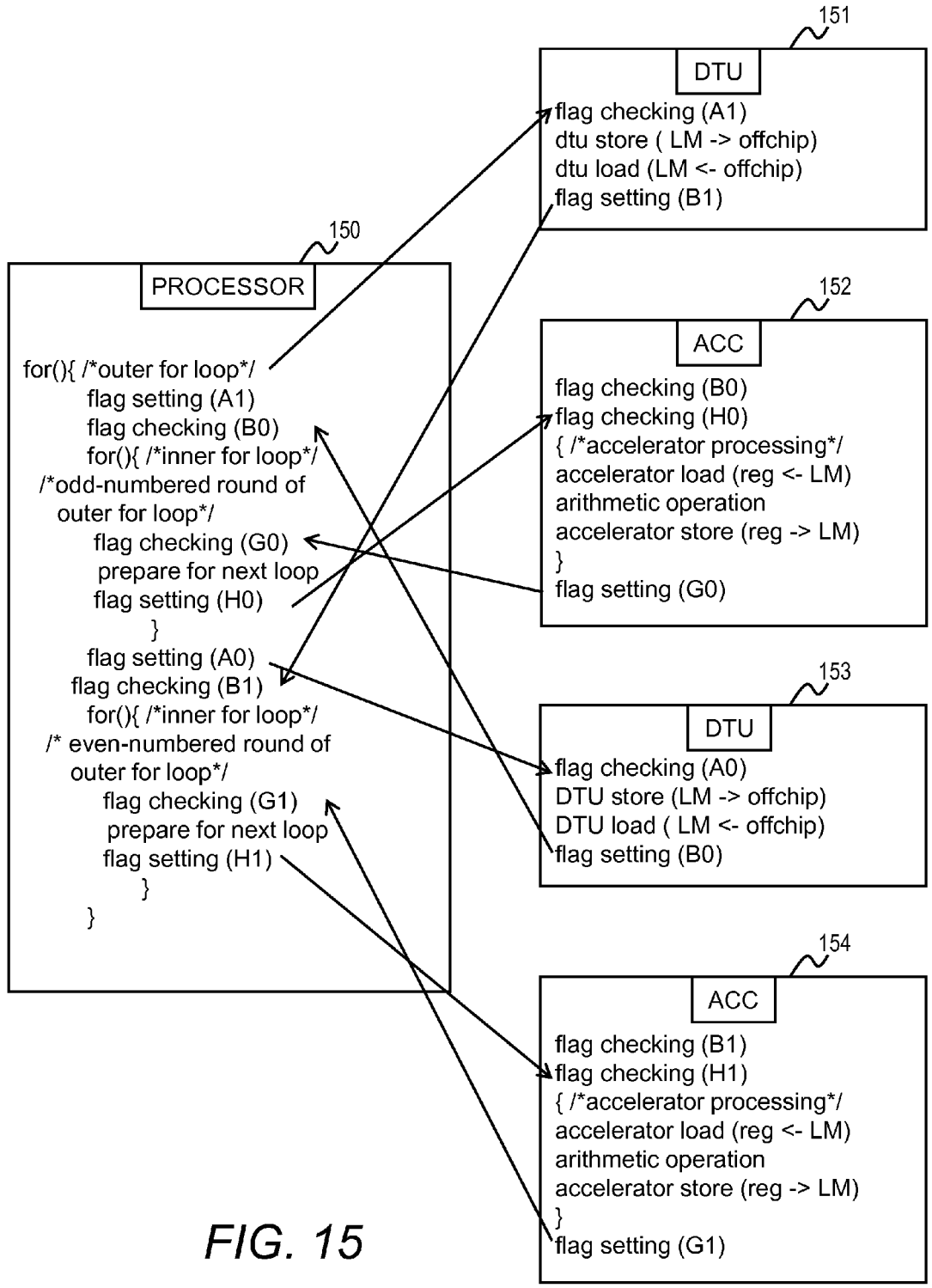
FIG. 15 is a diagram illustrating a program according to a third example executed in the multi-core processor system according to the embodiment of this invention.

FIG. 15 is a diagram illustrating a program according to a third example executed in the multi-core processor system 1 according to the embodiment of this invention.

As illustrated in FIG. 15, the program according to the third example includes a program 150 executed by the processor 11, programs 151 and 153 executed by the DTU 13, and programs 152 and 154 executed by the ACC 12. In other words, the program 80 illustrated in FIG. 8 is divided into the program 150 executed by the processor 11, the program 151 executed by the DTU 13, the program 153 executed by the DTU 13, the program 152 executed by the ACC 12, and the program 154 executed by the ACC 12 after being converted for the processor core according to the embodiment of this invention (adding thereto a flag setting sentence, a flag checking sentence, and the like).

Further, the program 150 for the processor 11 is different from the program 100 illustrated in FIG. 10 in the aspect that the inner for loop is divided into a plurality of portions (in FIG. 15, an odd-numbered round of the outer for loop ((2n+1)th round; hereinafter referred to simply as "odd-numbered round") and an even-numbered round thereof ((2n)th round; hereinafter referred to simply as "even-numbered round")).

In the same manner, the program for the DTU 13 is also divided into a plurality of portions (in FIG. 15, programs 151 and 153). The program 151 is a program for storing a calculation result obtained in the even-numbered round stored in the LM 15, and reading data for the next even-numbered round of calculation into the LM 15. On the other hand, the program 153 is a program for storing a calculation result obtained in the odd-numbered round stored in the LM 15, and reading data for the next odd-numbered round of calculation into the LM 15. It should be noted that, when the calculation result is not stored in the LM 15, the storing of the calculation result is not executed.

Further, the program for the ACC 12 is also divided into a plurality of portions (in FIG. 15, programs 152 and 154). The program 152 is a program for executing the odd-numbered round of the acceleration processing. On the other hand, the program 154 is a program for executing the even-numbered round of the acceleration processing.

It should be noted that each of the programs 150, 151, 152, 153, and 154 includes the flag setting sentence and the flag checking sentence that have different form from the form illustrated in FIG. 10. The respective programs 150, 151, 152, 153, and 154 are generated by the parallelizing compiler described later in advance, and are each located in the predetermined address on the memory such as the LM 15 and the DSM 14.

Figure 16:
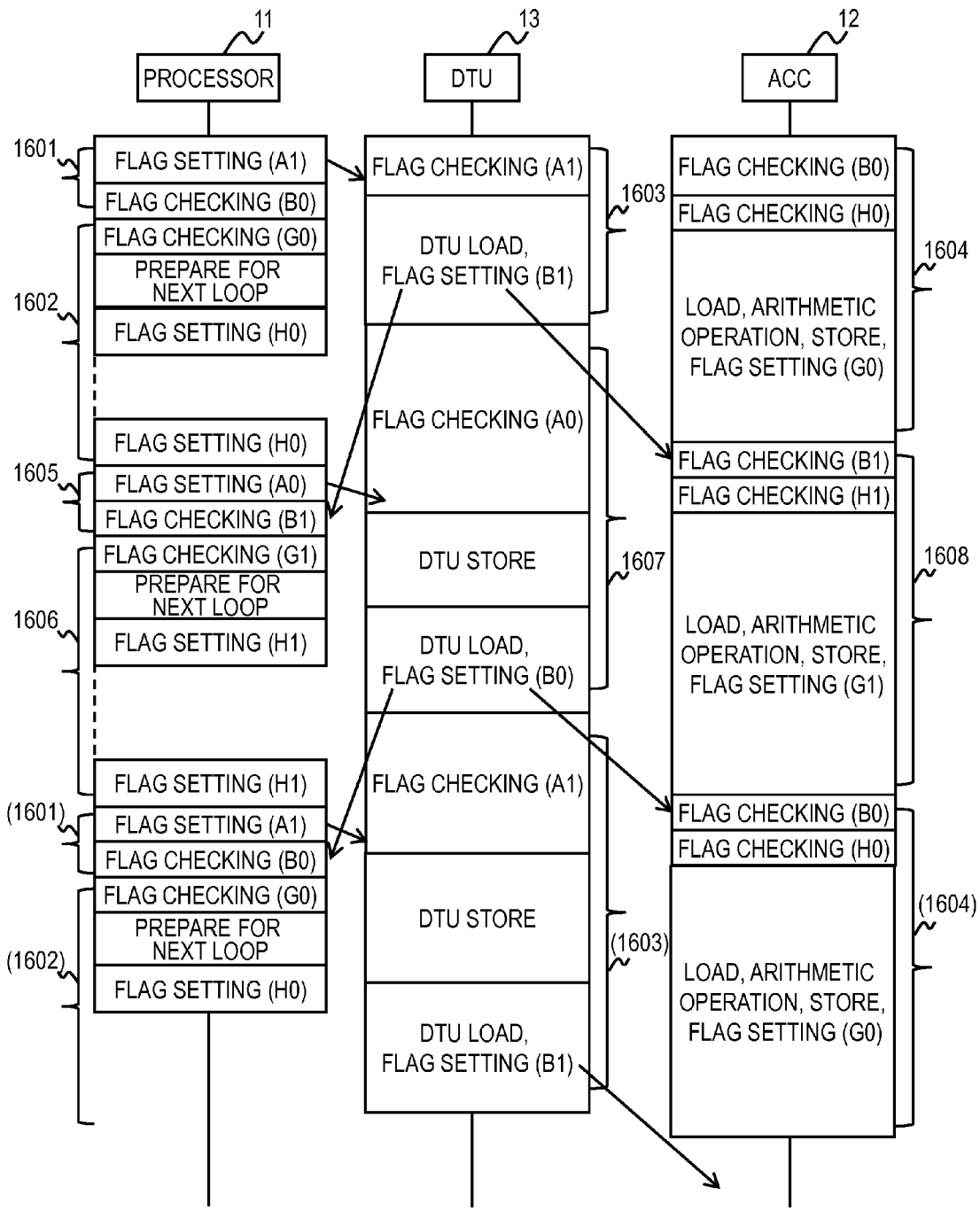
FIG. 16 is a diagram illustrating a flow of the processing when the program is executed according to the third example.

FIG. 16 is a diagram illustrating a flow of the processing when the program is executed according to the third example.

First, in Step 1601, the processor 11 operates in accordance with the program 150, and enters the loop of the outer for loop to execute writing of the flag into the flag variable μl and the confirmation of a flag variable B0 (1601).

After that, in Step 1602, the processor 11 enters the loop in the odd-numbered round (for the convenience of description, assumed as the first round) of the outer for loop to repeat the confirmation of a flag variable G0, the preparation for the next loop, and the writing of the flag into a flag variable H0 (1602). The processing of Step 1602 is the same as the repetition of the processing of Steps 1405 through 1407 illustrated in FIG. 14, and hence a description thereof is omitted here. It should be noted that the flag written in the flag variable B0 is returned (reset) to an initial state.

On the other hand, in Step 1603, the DTU 13 operates in accordance with the program 151 to execute the confirmation of the flag variable A1, the storing of the data, the reading of the data, and the writing of the flag into a flag variable B1 (1603). In the processing of Step 1603, the data to be stored does not exist, and hence the DTU 13 reads the data for the second round of the acceleration processing (Step 1608) as the next even-numbered round into the LM 15.

On the other hand, in Step 1604, the ACC 12 operates in accordance with the program 152 to execute the confirmation of the flag variable B0, the confirmation of the flag variable H0, and the first round of the acceleration processing (1604). At this time, the flags written into the flag variables B0 and H0 are returned to an initial state.

As described above with reference to the above-mentioned processing of Steps 1601 through 1604, the processor 11, the ACC 12, and the DTU 13 autonomously operate in synchronization with one another via the flag setting and the flag checking. In particular, when the ACC 12 is executing the first round of the acceleration processing, the DTU 13 can store calculation result data obtained in the previous acceleration processing (here, does not exist) and read the data to be used in the second round of the acceleration processing. In other words, the processing of the processor 11, the processing of the ACC 12, and the processing of the DTU 13 can be caused to overlap one another.

After that, in Step 1605, the processor 11 executes the writing of the flag into a flag variable A0 and the confirmation of the flag variable B1 (1605).

After that, in Step 1606, the processor 11 enters the loop in the second round of the outer for loop to repeat the confirmation of a flag variable G1, the preparation for the next loop, and the writing of the flag into a flag variable H1 (1606). The processing of Step 1606 is also the same as the repetition of the processing of Steps 1405 through 1407 illustrated in FIG. 14, and hence a description thereof is omitted here. It should be noted that the flag written in the flag variable B1 is returned to an initial state. After that, the processor 11 repeats the processing of Steps 1601, 1602, 1605, and 1606.

On the other hand, in Step 1607, the DTU 13 operates in accordance with the program 153 to execute the confirmation of the flag variable A0, the storing of the data, the reading of the data, and the writing of the flag into the flag variable B0 (1607). In the processing of Step 1607, the DTU 13 stores a calculation result of the first round of the acceleration processing indicated by Step 1604 into the LM 15, and reads the data for the third round of the acceleration processing as the next odd-numbered round into the LM 15. After that, the DTU 13 repeats the processing of Steps 1603 and 1607.

Further, in Step 1608, the ACC 12 operates in accordance with the program 154 to execute the confirmation of the flag variable B1, the confirmation of the flag variable H1, and the second round of the acceleration processing (1608). In the processing of Step 1608, the ACC 12 executes the acceleration processing for the data for the second round of the acceleration processing read in Step 1603. At this time, the flags written into the flag variables B1 and H1 are returned to an initial state. After that, the ACC 12 repeats the processing of Steps 1604 and 1608.

As described above with reference to the above-mentioned processing of Steps 1605 through 1608, the processor 11, the ACC 12, and the DTU 13 autonomously operate in synchronization with one another via the flag setting and the flag checking. In particular, when the ACC 12 is executing the second round of the acceleration processing, the DTU 13 can store the calculation result data obtained in the first round of the acceleration processing and read the data to be used in the third round of the acceleration processing. In other words, the processing of the processor 11, the processing of the ACC 12, and the processing of the DTU 13 can be caused to overlap one another.

As described above with reference to the above-mentioned processing, the processor 11, the ACC 12, and the DTU 13 autonomously operate in synchronization with one another via the flag setting and the flag checking. According to the program of the third example, when the ACC 12 is executing the acceleration processing (for example, odd-numbered round of processing), the DTU 13 can store the calculation result data obtained in the previous acceleration processing (even-numbered round of processing) and read the data to be used in the next acceleration processing (even-numbered round of processing).

Further, by separately providing a data area for the processing of the ACC 12, a data area for the data store of the DTU 13, and a data area for the data load of the DTU 13 (triple buffering) and causing the processing of the processor 11, the processing of the ACC 12, and the processing of the DTU 13 to overlap one another, it is possible to cover up the overhead for the data transfer and speed up the processing. Further, compared to the program of the second example described above, it is possible to further shorten the calculation time by the period corresponding to the overhead for the data transfer.

It should be noted that the program of the third example repeats the loop processing of the outer for loop and the inner for loop in the same manner as in the programs of the first example and the second example. Therefore, the program may be configured to write the flag value corresponding to the repeat count each time the loop processing is repeated. For example, in the n-th round of the loop processing indicated by the inner for loop, flag values (for example, H0n and H1n) to which the number n is added are written into the flag variables H0 and H1 and confirmed. This can reduce the overhead for returning the flag value into the initial state.

Further, the program may be configured to change the clock frequency to a low frequency, interrupt the clock frequency, or perform other such operation during a period until a predetermined time has passed based on the value set in the FVR 125 when the flag checking sentence is executed. This can reduce the power consumption involved in the flag checking.

Figure 17:
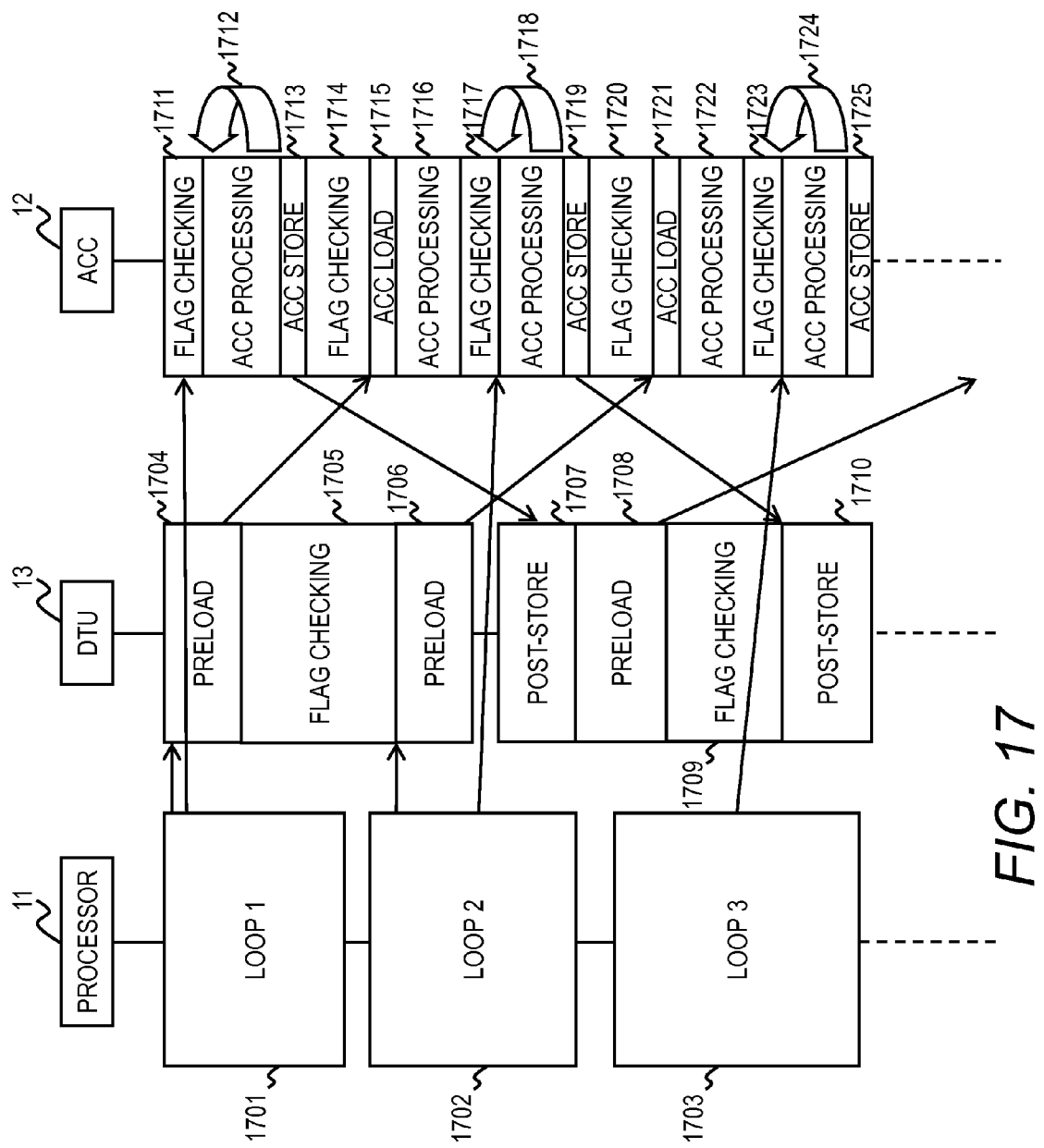
FIG. 17 is a diagram illustrating a flow of the processing when a program according to a fourth example is executed in the multi-core processor system according to the embodiment of this invention.

FIG. 17 is a diagram illustrating a flow of the processing when a program according to a fourth example is executed in the multi-core processor system 1 according to the embodiment of this invention.

The program according to the fourth example includes programs 1701 through 1703 executed by the processor 11, programs 1704 through 1710 executed by the DTU 13, and programs 1711 through 1725 executed by the ACC 12.

It should be noted that the programs 1701 through 1703 are programs for the processor 11 corresponding to the respective loop processing portions that are obtained by dividing a series of processing performed by the program executed in the multi-core processor system 1 into a plurality of loop processing portions in consideration of a size of the memory such as the LM 15. In the same manner, the programs 1704 through 1710 and the programs 1711 through 1725 are the program for the DTU 13 and the programs for the ACC 12, respectively, in the above-mentioned case.

Those programs 1701 through 1725 are generated by the parallelizing compiler described later in advance, and are each located in the predetermined address on the memory such as the LM 15 or the DSM 14.

It should be noted that the program 1701 includes a program for writing a flag used for cooperation with the processing of the program 1704, a program for writing a flag used for cooperation with the processing of the program 1712, and a program for controlling the processor 11 to perform the arithmetic processing by reading the data from the LM 15, the DSM 14, or the like (in other words, program for the processor 11 capable of operating in parallel with the ACC 12 or the like). In the same manner, the programs 1702 and 1703 include a program for writing a flag used for cooperation with the processing performed by the DTU 13 or the ACC 12.

The program 1704 is a program for controlling the DTU 13 to read in advance (preload) the data to be used by the ACC 12 for the acceleration processing in the program 1716 into the LM 15 or the DSM 14. The program 1704 preloads data having a size optimized by the parallelizing compiler described later into the LM 15 or the DSM 14. The program 1704 includes a program for writing a flag used for cooperation with the processing of the program 1715.

The program 1705 is a program for confirming the flag written in the processing of the program 1702.

The program 1706 is a program for controlling the DTU 13 to preload the data to be used by the ACC 12 for the acceleration processing in the program 1722 into the LM 15 or the DSM 14. In the same manner as in the program 1704, the program 1706 preloads data having a size optimized by the parallelizing compiler described later into the LM 15 or the DSM 14. The program 1706 includes a program for writing a flag used for cooperation with the processing of the program 1721.

The program 1707 is a program for storing (post-storing) the data, which is stored into the memory such as the LM 15 or the DSM 14 by the ACC 12 in the program 1713, into the on-chip centralized shared memory 40 or the off-chip centralized shared memory 50. The program 1707 includes a program for confirming the flag written by the program 1713. The programs 1708 through 1710 are the same as the programs 1705 through 1707, respectively, and hence descriptions thereof are omitted here.

The program 1711 is a program for confirming the flag written in the processing of the program 1701. The program 1712 is a program for controlling the ACC 12 to execute the acceleration processing steadily and repeatedly in cooperation with the processor 11. It should be noted that, for the convenience of description, it is assumed that the data used here to execute the acceleration processing is already preloaded. The program 1713 is a program for storing the calculation result data obtained in the acceleration processing performed by the program 1712 into the memory such as the LM 15 or the DSM 14.

The program 1714 is a program for confirming the flag written in the processing of the program 1704. The program 1715 is a program for reading the data, which is preloaded into the LM 15 or the DSM 14 by the DTU 13 in the processing of the program 1704, into the ACC register 122. The program 1716 is a program for controlling the ACC 12 to execute the acceleration processing for the data read into the ACC register 122.

The programs 1717 through 1725 are the same as the programs 1711 through 1716, respectively, and hence descriptions thereof are omitted here.

As described above with reference to the above-mentioned processing, the processor 11, the ACC 12, and the DTU 13 autonomously operate in synchronization with one another via the flag setting and the flag checking. According to the program of the fourth example, the processing of the ACC 12 can be executed after being divided into a portion (for example, program 1716) for executing the processing in cooperation (chaining) with the DTU 13 and a portion (for example, program 1718) for repeatedly executing the processing in cooperation with the processor 11. Therefore, for example, in cooperative processing with the DTU 13, the acceleration processing is executed without the intermediation of the processor 11, and hence the overhead for the control performed by the processor 11 can be covered up.

Further, in preload processing, when the ACC 12 is executing the acceleration processing, the DTU 13 reads the data for the next processing performed by the ACC 12, which has the size optimally divided by the parallelizing compiler in advance, into the LM 15 or the like. Therefore, it is possible to continuously supply data to the ACC 12. On the other hand, in post-store processing, when the ACC 12 is executing the acceleration processing, the DTU 13 can store the calculation result data, which is obtained from the ACC 12 in the acceleration processing, from the LM 15 or the like.

Figure 18:
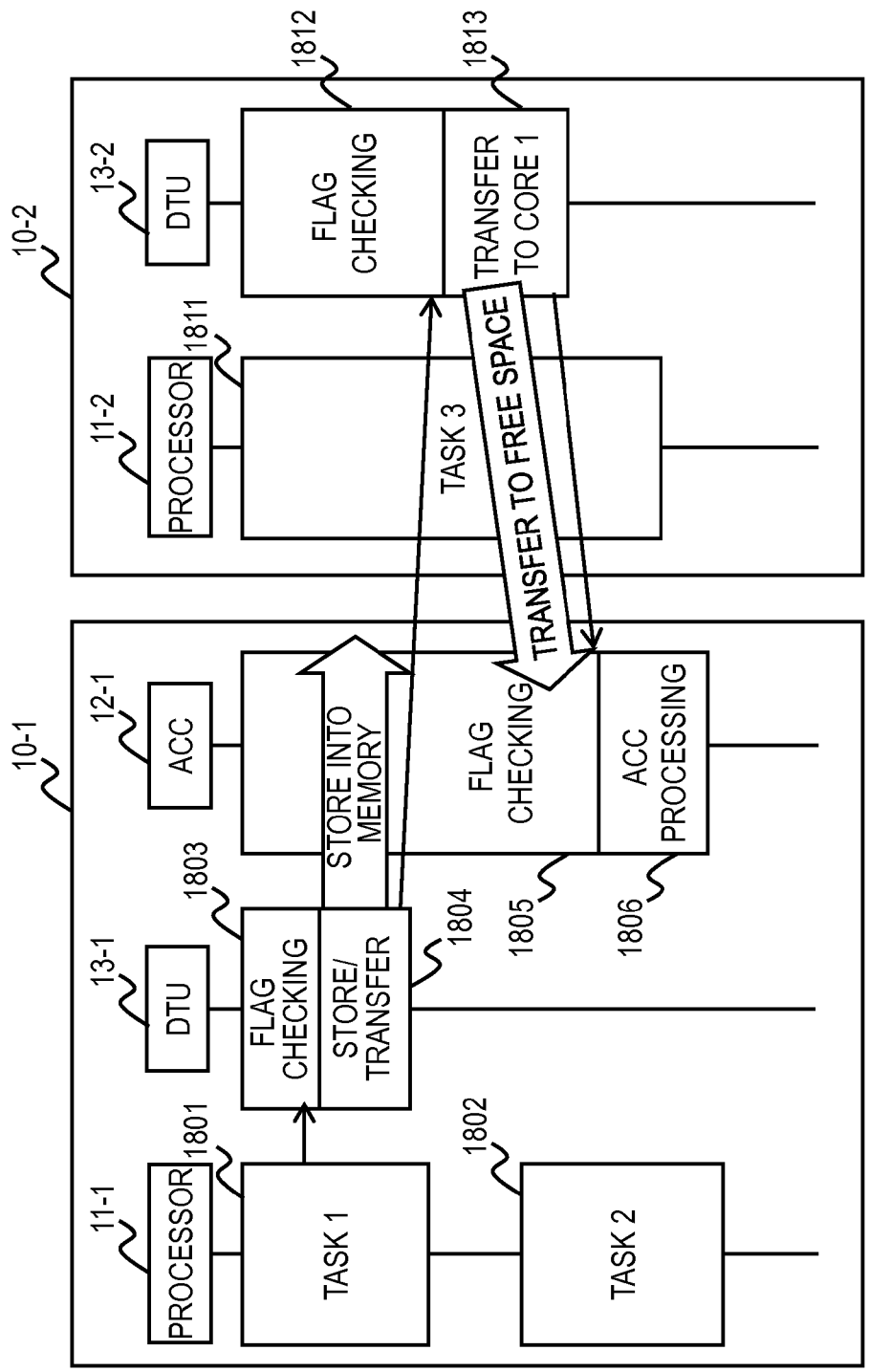
FIG. 18 is a diagram illustrating a flow of the processing when the program according to a fifth example is executed in the multi-core processor system according to the embodiment of this invention.

FIG. 18 is a diagram illustrating a flow of the processing when the program according to a fifth example is executed in the multi-core processor system 1 according to the embodiment of this invention. Here, an operation in which a DTU 13-1, an ACC 12-1, and a DTU 13-2 on a plurality of different processor cores 10-1 and 10-2 cooperate one another via the flag setting/checking is described.

The program according to the fifth example includes programs 1801 and 1802 executed by a processor 11-1 of the processor core 10-1, programs 1803 and 1804 executed by the DTU 13-1 thereof, and programs 1805 and 1806 executed by the ACC 12-1 thereof. Further, the program according to the fifth example includes the program 1811 executed by a processor 11-2 of the processor core 10-2 and the programs 1812 and 1813 executed by the DTU 13-2 thereof.

The programs 1801 through 1806 for the processor core 10-1 are generated by the parallelizing compiler described later in advance, and are each located in the predetermined address on the memory such as the LM 15 or the DSM 14 of the processor core 10-1. On the other hand, the programs 1807 through 1809 for the processor core 10-2 are each located in the predetermined address on the memory such as the LM 15 or the DSM 14 of the processor core 10-2.

It should be noted that the program 1801 is a program for controlling the processor 11-1 to execute a task 1. The program 1801 includes a program for writing the flag used for cooperation with the processing of the program 1803 performed by the DTU 13-1, when executing the task 1, into the LM 15 or the like of the processor core 10-1. The program 1802 is a program for controlling the processor 11-1 to execute a task 2.

The program 1803 is a program for confirming the flag written in the processing of the program 1801 performed by the processor 11-1. The program 1804 is a program for controlling the DTU 13-1 to store the calculation result data, which is obtained from the processor 11-1 and stored in the LM 15 or the DSM 14, into the off-chip centralized shared memory 50. The program 1804 includes a program for writing a flag used for cooperation with the processing of the program 1812 performed by the DTU 13-2 into the DSM 14 of the processor core 10-2.

The program 1805 is a program for controlling the ACC 12-1 to confirm the flag written in the processing of the program 1812 performed by the DTU 13-2. The program 1806 is a program for controlling the ACC 12-1 to execute the acceleration processing for the data transferred by the program 1813 performed by the DTU 13-2.

The program 1811 is a program for controlling the processor 11-2 to execute a task 3. The program 1812 is a program for controlling the DTU 13-2 to confirm the flag written in the processing of the program 1804 performed by the DTU 13-1. The program 1813 is a program for controlling the DTU 13-2 to store the calculation result data, which is obtained from the processor 11-2 and stored in the LM 15 or the DSM 14, into the DSM 14 of the processor core 10-1. The program 1813 includes a program for writing a flag used for cooperation with the processing of the program 1805 performed by the ACC 12-1 into the DSM 14 of the processor core 10-1.

As described above with reference to the above-mentioned processing, the processors 11-1 and 11-2, the ACC 12-1 and 12-2, and the DTUs 13-1 and 13-2 on the plurality of different processor cores 10-1 and 10-2 can autonomously operate in synchronization with one another via the flag setting and the flag checking.

As apparent from the descriptions relating to this invention that have been made so far, not only two processor cores such as the processor cores 10-1 and 10-2, but also (processors 11, ACCs 12, and DTUs 13 of) all the processor cores 10-1 through 10-n can autonomously synchronize the processing when executing in parallel the programs for the respective processor cores generated by the parallelizing compiler from a serial processing program. This eliminates the need to newly extend the instruction set even when the ACC 12 is added, and in addition, greatly reduces involvement in (in other words, overhead for) the synchronization among the processor 11, the ACC 12, and the DTU 13, to thereby be able to execute the arithmetic processing with efficiency.

Figure 19:
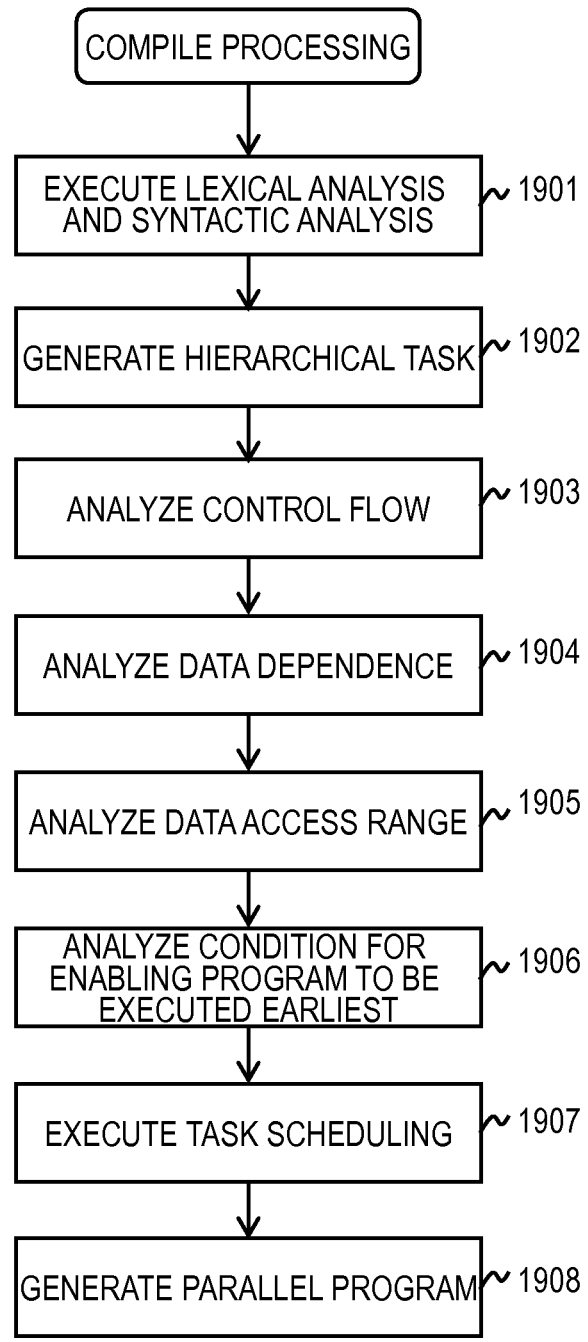
FIG. 19 is a flowchart of processing executed by the parallelizing compiler according to the embodiment of this invention.

FIG. 19 is a flowchart of processing executed by the parallelizing compiler according to the embodiment of this invention. Here, processing executed on a computer by the parallelizing compiler for generating a parallelization program executed/processed in the processor system including the ACC according to the embodiment of this invention from the serial processing program is described. A compiler generally represents software for converting the source program of a compile target into a so-called program (such as program in machine language) that can be executed by the computer, but the parallelizing compiler referred to in this invention means a compiler for generating the parallelization program from a source code of the serial processing program as described above.

First, the parallelizing compiler subjects the source program to a lexical analysis, and subjects program sentences thereof to a syntactic analysis (1901). It should be noted that, in this embodiment, the compiler analyzes the program, but a programmer (person) may analyze the program. Further, the information on the program necessary in this embodiment may be created when the program is created.

Next, the parallelizing compiler generates a hierarchical task, in other words, an expression using a hierarchical macro task of the program, based on a syntactic analysis result (1902). Here, the parallelizing compiler generates a coarse granularity task (macro task) formed of a task for the processor 11, a task for the ACC 12, and the like. It should be noted that, when being capable of loop-iteration-level parallel processing or serial processing, the generated macro task is divided into a plurality of different macro tasks (loop aligned decomposition) in consideration of the size of the memory such as the LM 15.

After that, the parallelizing compiler analyzes a dependence relationship (control flow) between the generated tasks (1903), analyzes data dependence between the tasks (1904), and analyzes a range of data accessed by each of the tasks (1905).

After that, the parallelizing compiler uses an analysis result of the program to analyze a condition for enabling the program to be executed earliest (1906), and uses an analysis result of the condition for enabling the program to be executed earliest to determine a parallel processing segment and the number of processors to which the tasks are allocated and generate a macro-task graph.

After that, the parallelizing compiler executes task scheduling for determining an order of executing the respective tasks (1907). The task scheduling executed here includes the memory management/task scheduling, data transfer scheduling, and low power consumption scheduling.

The memory management/task scheduling represents scheduling for executing efficient data exchange via the LMs 15 of the respective processor cores 10-1 through 10-n.

The data transfer scheduling represents scheduling for realizing optimization of the data transfer among the respective processor cores 10-1 to 10-n and the data transfer across the entire multi-core processor system 1 as the preload and the post-store illustrated in the example of FIG. 17.

The low power consumption scheduling represents scheduling for realizing such power control as to change the clock frequency to a low frequency or interrupt power supply depending on a waiting time when the processor 11, the ACC 12, or the DTU 13 is brought to a standby state.

After that, based on the task scheduling executed in Step 1907, the parallelizing compiler generates a parallel program that can be executed in the multi-core processor system 1 (1908). The parallel program includes the instruction sentences of the task for the processor 11, the task for the ACC 12, and the task for the DTU 13. In the parallel program generated here, the flag setting sentence and the flag checking sentence are inserted into the instruction sentences of the task for the processor 11, the task for the ACC 12, and the task for the DTU 13 that depend on each other. Those instruction sentences of the task for the ACC 12 and the task for the DTU 13 and a flag area therefor are located in at least any one memory of the DSM 14, the LM 15, the on-chip centralized shared memory 40, and the off-chip centralized shared memory 50.

It should be noted that a specific operation can also be associated with the value of the flag to designate the operation to be performed after the flag checking. For example, the flag checking sentence for the ACC 12 is configured to confirm the value within the control register file 124 when the checked value of the flag is a specific value, and execute the instruction string (task) designated by the processor 11.

As described above, the parallelizing compiler generates separate programs for the processor 11, the ACC 12, and the DTU 13. After that, the parallelizing compiler stores each of the generated programs into the predetermined address on the LM 15 or the DSM 14 of each of the processor cores 10-1 through 10-n, the on-chip centralized shared memory 40, or the off-chip centralized shared memory 50.

While the present invention has been described in detail and pictorially in the accompanying drawings, the present invention is not limited to such detail but covers various obvious modifications and equivalent arrangements, which fall within the purview of the appended claims.

For example, the descriptions of the embodiment of this invention are directed to the operation in which the processor 11, the ACC 12, and the DTU 13 synchronize with one another via the flag setting/checking, but this invention is not limited to such a case. The respective apparatus may synchronize with one another by a method other than the flag setting/checking, in other words, by issuing and confirming a notification indicating that the processing of the own apparatus has been completed.

What is claimed is:

1. A processor system comprising:
at least one processor core including
a processor for performing arithmetic processing,
a first memory, and
an accelerator coupled to the processor and the first memory through a coupling network, wherein
the first memory includes:
an instruction area for storing a task to be executed by the processor and the accelerator in advance,
a synchronization flag area for storing a flag used to synchronize an operation of the processor and an operation of the accelerator therebetween, and
a data area for storing data to be processed by the processor and the accelerator and data processed by the processor and the accelerator as processed data,
the accelerator is configured to:
read an instruction included in the task to be executed by the accelerator which is stored in the instruction area when the processor system is booted,
operate in accordance with the instruction read by the accelerator,
start, even when the processor is executing another processing, acceleration processing by reading the data stored in the data area and executing the instruction read by the accelerator corresponding to a flag in a case where the instruction read by the accelerator is a flag checking instruction and it is confirmed by the flag checking instruction that a flag indicating that the processor has completed predetermined processing has been written into the synchronization flag area, and
store data subjected to the acceleration processing into the data area by the instruction read by the accelerator after completion of the acceleration processing, and further write a flag indicating that the completion of the acceleration processing into the synchronization flag area by a flag setting instruction read by the accelerator, and the processor is configured to:

read an instruction included in the task to be executed by the processor which is stored in the instruction area when the processor system is booted operate in accordance with the instruction read by the processor, and start, even when the accelerator is executing another processing, the instruction read by the processor corresponding to a flag in a case where the instruction read by the processor is a flag checking instruction and it is confirmed by the flag checking instruction that the flag indicating the completion of the acceleration processing has been written into the synchronization flag area.

2. The processor system according to claim 1, wherein each of the accelerator and the processor is configured to write a plurality of different flags corresponding to instructions to be executed subsequently into the synchronization flag area in accordance with progress of processing executed by itself, and each of the accelerator and the processor for subsequently executing the instructions is configured to confirm the flag written in the synchronization flag area and execute the instruction corresponding to the flag.

3. The processor system according to claim 1, wherein the first memory includes at least one of a local memory that is accessible by the accelerator and the processor, and a distributed shared memory that is accessible by another processor core, the at least one processor core further includes a data transfer unit for transferring data between the first memory and a second memory wherein the second memory is different from the first memory, the synchronization flag area includes an area for storing a flag used to synchronize an operation of the data transfer unit and operations of the processor and the accelerator therebetween, the instruction area includes an area for storing a task to be executed by the data transfer unit in advance, the accelerator is configured to:

start, even when the data transfer unit is executing another data transfer processing, the acceleration processing by reading the data written in the data area and executing the instruction read by the accelerator corresponding to the flag in a case of confirming that a flag indicating that the data transfer unit has completed predetermined data transfer processing has been written into the synchronization flag area, and store the data subjected to the acceleration processing into the data area after the completion of the acceleration processing, and further write the flag indicating the completion of the acceleration processing into the synchronization flag area, and the data transfer unit is configured to start, even when the accelerator is executing another processing, data transfer processing by executing the instruction corresponding to the flag in a case of confirming that the flag indicating the completion of the acceleration processing has been written into the synchronization flag area.

4. The processor system according to claim 1, wherein the accelerator includes:

a processing part for executing the acceleration processing, an internal storage area for temporarily storing data processed by the processing part, and a load/store unit for executing data transfer between the internal storage area and the first memory, and the load/store unit includes a load/store-unit-side flag writing/confirming unit for writing a flag into the synchronization flag area in accordance with an execution status of the data transfer between the internal storage area and the first memory and confirming that the flag has been written into the synchronization flag area.

5. The processor system according to claim 1, wherein the accelerator includes:

a processing part for executing the acceleration processing, and an internal storage area for temporarily storing data processed by the processing part, and the processing part includes a processing-part-side flag writing/confirming unit for writing a flag into the synchronization flag area in accordance with an execution status of data transfer between the internal storage area and the processing part and confirming that the flag has been written into the synchronization flag area.

6. The processor system according to claim 1, wherein the accelerator includes:

a processing part for executing the acceleration processing, an internal storage area for temporarily storing data processed by the processing part, and a load/store unit for executing data transfer between the internal storage area and the first memory, the processing part includes a processing-part-side flag writing/confirming unit for writing a flag into the synchronization flag area in accordance with an execution status of processing performed by the processing part and confirming that the flag has been written into the synchronization flag area, and the load/store unit includes a load/store-unit-side flag writing/confirming unit for writing a flag into the synchronization flag area in accordance with the execution status of processing performed by the load/store unit and confirming that the flag has been written into the synchronization flag area.

7. The processor system according to claim 1, wherein the accelerator includes:

a processing part for executing the acceleration processing, an internal storage area for temporarily storing data processed by the processing part, a load/store unit for executing data transfer between the internal storage area and the first memory, and a flag exchange register for storing a flag used to synchronize an operation of the processing part and an operation of the load/store unit, the processing part includes a processing-part-side flag writing/confirming unit for writing a flag into one of the synchronization flag area and the flag exchange register in accordance with an execution status of processing performed by the processing part and confirming that the flag has been written into the one of the synchronization flag area and the flag exchange register, and the load/store unit includes a load/store-unit-side flag writing/confirming unit for writing a flag into one of the synchronization flag area and the flag exchange register in accordance with the execution status of processing performed by the load/store unit and confirming that the flag has been written into the one of the synchronization flag area and the flag exchange register.

8. The processor system according to claim 1, wherein the processor system includes a plurality of the processor cores.

9. The processor system according to claim 8, further comprising at least one of an on-chip centralized shared memory provided on a semiconductor chip shared by the plurality of the processor cores or an off-chip centralized shared memory provided outside the semiconductor chip which is shared by the plurality of the processor cores.

10. The processor system according to claim 3, wherein:
the accelerator further includes at least one of a memory or a register as the second memory provided inside the accelerator, and
the data transfer unit is configured to:
store, even when one of the processor and the accelerator is executing another processing, calculation result data obtained from the accelerator in the acceleration processing from the second memory into the first memory in a case of confirming that the flag indicating the completion of the acceleration processing has been written into the synchronization flag area,
execute load processing for previously read data to be used in a next round of the acceleration processing performed by the accelerator from the first memory into the accelerator even when one of the processor and the accelerator is executing another processing, and
write a flag indicating that the load processing has been completed into the synchronization flag area.

11. A processor system comprising:
at least one processor core including:
a first memory, and
components,
wherein the components include:
a processor for performing arithmetic processing,
a data transfer unit for transferring data between the first memory and a second memory, wherein the second memory is different from the first memory, and
an accelerator coupled to the processor, the first memory, and the data transfer unit through a coupling network,
wherein the first memory includes:
an instruction area for storing, in advance, a task to be executed by each of the respective components;
a synchronization flag area for storing a flag used to synchronize respective operations of the respective components therebetween, and
a data area for storing data to be processed by the respective components and data processed by the respective components as processed data; and
the respective components are configured to read an instruction included in tasks corresponding to the respective components stored in the instruction area when the processor system is booted, and operate in accordance with the instruction read by the respective components stored in the instruction area,
a first component of the respective components is configured to complete predetermined processing according to the instruction read, store data processed by the first component into the data area, and write a flag indicating completion of the predetermined processing into the synchronization flag area in accordance with tasks corresponding to the first component; and
a second component other than the first component among the respective components is configured to start, even when a component other than the second component among the respective components is executing another processing, execution of an instruction read by the second component corresponding to a flag by reading the processed data stored in the data area in a case of confirming that the flag has been written by the instruction read by the second component, storing data subjected to the execution of the instruction into the data area after completion of the execution of the instruction, and writing a flag indicating the completion of the instruction into the synchronization flag area in accordance with tasks corresponding to the second component.

12. The processor system according to claim 11, wherein instructions executed by the respective components including the processor, the accelerator, and the data transfer unit are generated from a program to be executed in the processor system with reference to information obtained by analyzing the program as a generated instruction, and
the generated instruction is associated with the flag.

13. The processor system according to claim 11, wherein the accelerator further includes at least one of a memory or a register as the second memory provided inside the accelerator, and
the data transfer unit is configured to:
store, even when one of the processor and the accelerator is executing another processing, calculation result data obtained from the accelerator in the acceleration processing from the second memory into the first memory in a case of confirming that a flag indicating the completion of the acceleration processing has been written into the synchronization flag area,
execute load processing for previously read data to be used in a next round of the acceleration processing performed by the accelerator from the first memory into the accelerator even when one of the processor and the accelerator is executing another processing, and
write a flag indicating that the load processing has been completed into the synchronization flag area.

14. The processor system according to claim 11, wherein the first memory includes at least one of a local memory that is accessible by the accelerator and the processor, and a distributed shared memory that is accessible by another processor core.

15. The processor system according to claim 11, wherein the second memory includes a distributed shared memory in another processor core, or a shared memory that is outside the processor cores and is accessible by each of the processor cores.

16. An accelerator, which is included in a processor system including a processor for performing arithmetic processing and a first memory for storing data, the accelerator being coupled to the processor and the first memory through a coupling network,
wherein the first memory includes:
an instruction area for storing a task to be executed by the processor and the accelerator in advance,
a synchronization flag area for storing a flag used to synchronize an operation of the processor and an operation of the accelerator therebetween, and
a data area for storing data to be processed by the processor and the accelerator and data processed by the processor and the accelerator as processed data,
the accelerator includes:
a processing part for executing acceleration processing, and an internal storage area for temporarily storing data processed by the processing part, wherein the accelerator is configured to:

read an instruction included in the task to be executed by the accelerator which is stored in the instruction area when the processor system is booted, operate in accordance with the instruction read by the accelerator, start, even when the processor is executing another processing, the acceleration processing by executing the instruction read by the accelerator corresponding to a flag by the processing part in a case where the instruction read by the accelerator is a flag checking instruction and it is confirmed that a flag indicating that the processor has completed predetermined processing has been written into the synchronization flag area, and write calculation result data obtained in the acceleration processing into the internal storage area, and write a flag indicating completion of the acceleration processing into the synchronization flag area by the read instruction after the acceleration processing has been completed.

17. The accelerator according to claim 16, wherein the tasks to be executed by the processor and the accelerator are generated from a program to be executed in the processor system with reference to information obtained by analyzing the program as a generated instruction, and the generated instruction is associated with the flag.

18. The accelerator according to claim 16, wherein the accelerator is configured to write a plurality of different flags corresponding to instructions to be executed subsequently into the synchronization flag area in accordance with progress of processing executed by itself.

19. The accelerator according to claim 16, further comprising a load/store unit for executing data transfer between the internal storage area and the first memory, wherein the load/store unit includes a load/store-unit-side flag writing/confirming unit for writing the flag into the synchronization flag area in accordance with an execution status of the data transfer between the internal storage area and the first memory and confirming that the flag has been written into the synchronization flag area.

20. The accelerator according to claim 19, wherein the processing part includes a processing-part-side flag writing/confirming unit for writing the flag into the synchronization flag area in accordance with an execution status of processing performed by the processing part and confirming that the flag has been written into the synchronization flag area.

21. The accelerator according to claim 20, further comprising a flag exchange register for storing a flag used to synchronize an operation of the processing part and an operation of the load/store unit, wherein the processing-part-side flag writing/confirming unit is configured to write the flag into the flag exchange register in accordance with the execution status of the processing performed by the processing part, and to confirm that the flag has been written into the flag exchange register, and the load/store-unit-side flag writing/confirming unit is configured to write the flag into the flag exchange register in accordance with the execution status of the processing performed by the load/store unit, and to confirm that the flag has been written into the flag exchange register.

22. The accelerator according to claim 16, wherein the processing part includes a processing-part-side flag writing/confirming unit for writing the flag into the synchronization flag area in accordance with an execution status of data transfer between the internal storage area and the processing part and confirming that the flag has been written into the synchronization flag area.

23. A processor system comprising:

at least one processor core including:

a processor for performing arithmetic processing, a first memory, and an accelerator coupled to the processor and the first memory through a coupling network, wherein the first memory includes:

an instruction area for storing, in advance, a first task to be executed by the processor and a second task to be executed by the accelerator, a synchronization flag area for storing flags used to synchronize an operation of the processor and an operation of the accelerator therebetween, and a data area for storing data to be processed by the processor and the accelerator and data processed by the processor and the accelerator as processed data, the accelerator is configured to:

read instructions included in the second task which is stored in the instruction area when the processor system is booted, for operating in accordance with the instructions, confirm, by a flag checking instruction included in the instructions, that a first flag indicating that the processor has completed predetermined processing has been written into the synchronization flag area, start, even when the processor is executing another processing, acceleration processing by reading data stored in the data area after confirming that the first flag has been written into the synchronization area, and execute an acceleration processing instruction included in the instructions read by the accelerator, corresponding to the first flag, complete the acceleration processing by storing data subjected to execution of the acceleration processing instruction into the data area by an instruction included in the instructions read by the accelerator, and further write a second flag indicating that completion of the acceleration processing into the synchronization flag area by a flag setting instruction included in the instructions read by the accelerator; and the processor is configured to:

read instructions included in the first task which is stored in the instruction area when the processor system is booted, for operating in accordance with the instructions read by the processor, confirm, by a flag checking instruction included in the instructions, that the second flag has been written into the synchronization flag area, and start, even when the accelerator is executing another processing, execution of the instructions read by the processor, corresponding to the second flag, after confirming that the second flag has been written into the synchronization flag area.

24. A processor system comprising:

at least one processor core including:

a first memory, and components, wherein the components include:

a processor for performing arithmetic processing, a data transfer unit for transferring data between the first memory and a second memory, wherein the second memory is different from the first memory, and an accelerator coupled to the processor, the first memory, and the data transfer unit through a coupling network, wherein the first memory includes:
an instruction area for storing, in advance, a first task to be executed by a first component and a second task to be executed by a second component;
a synchronization flag area for storing flags used to synchronize respective operations of the respective components therebetween, and
a data area for storing data to be processed by the respective components and data processed by the respective components as processed data; and the respective components are configured to read instructions included in tasks corresponding to the respective components stored in the instruction area when the processor system is booted, for operating in accordance with the instructions, the first component of the respective components is configured to:

confirm, by a flag checking instruction included in the instructions, that a first flag indicating that the second component has completed predetermined processing has been written into the synchronization flag area, start, even when the second component is executing another processing, predetermined processing by reading data stored in the data area, after confirming that the first flag has been written into the synchronization area, execute a predetermined processing instruction included in the instructions read by the first component, corresponding to the first flag, complete the predetermined processing by storing data subjected to execution of the predetermined processing instruction into the data area by an instruction included in the instructions read by the first component, and write a second flag indicating completion of the predetermined processing into the synchronization flag area in accordance with the first task corresponding to the first component; and the second component other than the first component among the respective components is configured to:

confirm, by a flag checking instruction included in the instructions, that the second flag has been written into the synchronization flag area, and start, even when a component other than the second component among the respective components is executing another processing, execution of the instructions read by the second component, corresponding to the second flag, after confirming that the second flag has been written into the synchronization flag area, storing data subjected to the execution of the instructions into the data area after completion of the execution of the instructions, and writing the first flag indicating the completion of the instructions into the synchronization flag area in accordance with the second task corresponding to the second component.

25. An accelerator, which is included in a processor system including a processor for performing arithmetic processing and a first memory for storing data, the accelerator being coupled to the processor and the first memory through a coupling network, wherein the first memory includes:
an instruction area for storing, in advance, a first task to be executed by the processor and a second task to be executed by the accelerator,
a synchronization flag area for storing flags used to synchronize an operation of the processor and an operation of the accelerator therebetween, and
a data area for storing data to be processed by the processor and the accelerator and data processed by the processor and the accelerator as processed data, the accelerator includes:
a processing part for executing acceleration processing, and
an internal storage area for temporarily storing data processed by the processing part, wherein the accelerator is configured to:
read instructions included in the second task which is stored in the instruction area when the processor system is booted, for operating in accordance with the instructions, confirm, by a flag checking instruction included in the instructions, that a first flag indicating that the processor has completed predetermined processing has been written into the synchronization flag area, start, even when the processor is executing another processing, the acceleration processing by reading data stored in the data area after confirming that the first flag indicating that the processor has completed predetermined processing has been written into the synchronization flag area, execute an acceleration processing instruction included in the instructions read by the accelerator, corresponding to the first flag, complete the acceleration processing by storing data subjected to execution of the acceleration processing instruction into the data area by an instruction included in the instructions read by the accelerator, and write calculation result data obtained in the acceleration processing into the internal storage area, and write a second flag indicating completion of the acceleration processing into the synchronization flag area by a flag setting instruction included in the instructions read by the accelerator.

* * * * *